United States Patent [19]

Shibato et al.

[11] Patent Number: 5,093,390

[45] Date of Patent: Mar. 3, 1992

[54] POLYMER NON-AQUEOUS DISPENSION, PROCESS FOR PREPARING THE SAME AND COATING COMPOSITION FORMULATED THEREWITH

[75] Inventors: Kishio Shibato, Kamakura; Fumio Sakurai, Chigasaki; Atsuhiro Sakai; Toru Imai, both of Yokohama; Osamu Ohe, Tokyo, all of Japan

[73] Assignee: Nippon Oil and Fats Company, Limited, Tokyo, Japan

[21] Appl. No.: 535,501

[22] Filed: Jun. 11, 1990

Related U.S. Application Data

[60] Division of Ser. No. 384,098, Jul. 24, 1989, Pat. No. 4,963,601, which is a continuation of Ser. No. 225,378, Jul. 28, 1988, abandoned.

[30] Foreign Application Priority Data

| Aug. 12, 1987 | [JP] | Japan | 62-200061 |
|---|---|---|---|
| Nov. 13, 1987 | [JP] | Japan | 62-285607 |
| Dec. 3, 1987 | [JP] | Japan | 62-304543 |
| May 2, 1988 | [JP] | Japan | 63-109580 |

[51] Int. Cl.$^5$ .............................................. C08K 3/00
[52] U.S. Cl. ........................... 523/339; 524/558; 524/816; 524/845; 524/901
[58] Field of Search ............................................. 523/339

[56] References Cited

U.S. PATENT DOCUMENTS

| 3,880,796 | 4/1975 | Christenson et al. | 260/33.6 |
|---|---|---|---|
| 4,055,607 | 10/1977 | Sullivan et al. | 260/851 |
| 4,075,141 | 2/1978 | Porter, Jr. et al. | 260/16.2 |
| 4,147,688 | 4/1979 | Makhlouf et al. | 260/33.6 |
| 4,209,435 | 6/1980 | Backhouse | 260/29.6 |
| 4,220,679 | 9/1980 | Backhouse | 427/401 |
| 4,273,695 | 6/1981 | Greene et al. | 524/558 |
| 4,290,932 | 9/1981 | Wright et al. | 260/29.6 |
| 4,296,013 | 10/1981 | Gibbs | 260/29.6 |
| 4,322,328 | 3/1982 | Graetz et al. | 584/458 |
| 4,324,714 | 4/1982 | Gibbs et al. | 524/113 |
| 4,377,661 | 3/1983 | Wright et al. | 524/522 |
| 4,414,357 | 11/1983 | Wright et al. | 524/513 |
| 4,461,870 | 6/1984 | Kanda et al. | 525/123 |
| 4,477,536 | 10/1984 | Wright et al. | 428/522 |
| 4,530,946 | 7/1985 | Kanda et al. | 523/418 |
| 4,540,740 | 9/1985 | Olson et al. | 524/811 |
| 4,563,372 | 1/1986 | Kurauchi et al. | 427/409 |
| 4,598,111 | 7/1986 | Wright et al. | 524/40 |
| 4,611,026 | 9/1986 | Olson et al. | 524/548 |
| 4,677,152 | 6/1987 | Allen et al. | 524/558 |

FOREIGN PATENT DOCUMENTS

| 0172724 | 2/1986 | European Pat. Off. . |
|---|---|---|
| 2304622 | 10/1976 | France . |
| 43-16147 | 7/1968 | Japan . |
| 47-6789 | 4/1972 | Japan . |
| 967051 | 8/1964 | United Kingdom . |
| 1588976 | 5/1981 | United Kingdom . |
| 1588978 | 5/1981 | United Kingdom . |
| 1594123 | 7/1981 | United Kingdom . |

OTHER PUBLICATIONS

J. Stone-Matsui et al., "Characterization of Surface Charge on Polystyrene Latices", 1975, *Journal of Colloid and Interface Science*, vol. 52, No. 3.

*Journal of Polymer Science*, "Microgel: An idealized Polymer Molecule", vol. XXXIII, pp. 101–117 (1958), V. E. Shashoua et al.

*Primary Examiner*—Joseph L. Schofer
*Assistant Examiner*—Mark Sweet
*Attorney, Agent, or Firm*—Stevens, Davis, Miller & Mosher

[57] ABSTRACT

A process for preparing polymer non-aqueous dispersions to be formulated together with a binder component in coating compositions, which comprises the steps of: (1) emulsion polymerizing a hydroxy group containing $\alpha,\beta$-ethylenically unsaturated monomer, a polyfunctional $\alpha,\beta$-ethylenically unsaturated monomer and an $\alpha,\beta$-ethylenically unsaturated monomer different therefrom by using a water-soluble polymerization initiator, preferably a persulphate, in a soap free system or in the presence of an ester group containing anionic or cationic surfactant; adding an organic solvent, preferably comprising an amphipathic organic solvent, to a resultant polymer aqueous dispersion; and then adding a basic compound catalyst when the anionic surfactant is used or an acidic compound catalyst when the cationic surfactant is used, to thereby hydrolyze completely said surfactant and water-soluble polymerization initiator at a temperature not exceeding 95° C. as in the condition of suspension; (2) adding an acidic or basic compound to said suspension to neutralize said basic or acidic compound catalyst: then after adding dispersion stabilizing resin, further adding an amine salt of organic acid, followed by leaving said suspension to stand to separate into organic and water layers; and isolating the organic layer from the water layer; and (3) removing residual water in the organic layer. The resultant polymer nonaqueous dispersion comprises polymer particles having a total ionic group concentration (I) less than $2 \times 10^{-5}$ mol/g particle, a hexane tolerance (HT) from 5 to 40 exclusive and a degree of swelling in acetone (S) less than 10, and used with a binder component comprising a polyol resin and a curing agent for preparing coating compositions.

3 Claims, No Drawings

POLYMER NON-AQUEOUS DISPENSION, PROCESS FOR PREPARING THE SAME AND COATING COMPOSITION FORMULATED THEREWITH

This is a Division of application Ser. No. 07/384,098, filed July 24, 1989, now U.S. Pat. No. 4,963,601, which in turn is a continuation of application Ser. No. 07/225,378, filed July 28, 1988, abandoned.

BACKGROUND OF THE INVENTION

1. Field of the Invention

The present invention relates to stable polymer non-aqueous dispersions which comprise dispersed particles having nonionic and highly reactive surfaces, and are employable as anti-sag agents of coating compositions and aluminum pigment orientators or binder components of metallic coatings, and to a process for preparing the same and further to coating compositions formulated with the same.

2. Description of the Prior Art

Recently, coatings for automobiles have made a great advance in durability, providing high performances. This advance has been accompanied by increasing demands for higher qualities in aesthetic appearance of the coating films.

To accede to such demands, as for example disclosed in Japanese Patent Application Laid-open No. 53-133,234 (British Patent Specification No. 1,588,976), crosslinked polymer particles (may be hereinafter referred to as "polymer particles" or simply "particles") formed by emulsion polymerization processes or the NAD process have recently drawn particular attention from the fact that the polymer particles, when used in coating compositions, provide the coating compositions with structural viscosity based on interactions between the particles to display excellent flow control functions, such as metallic pigments orientation, sag prevention or the like.

The polymer particles to be used for such purposes are provided in the form of polymer non-aqueous dispersions that can be roughly classified into the following three types. Namely, the first type is, as disclosed in Japanese Patent Applications Laid-open Nos. 58-129,065, 58-129,066, 58-129,069 (U.S. Pat. Nos. 4,530,946 and 4,461,870 are counterparts of these three), 60-250,068 and 61-42,579 (U.S. Pat. No. 4,563,372 is counterpart of these two), those obtained by the steps of: preparing crosslinked polymer particles by emulsion polymerization of $\alpha,\beta$-ethylenically unsaturated monomers in the presence of an amphoteric resinous surface active agent; then spray drying the resulting polymer particles to obtain dried particles; and re-dispersing the obtained dried particles in a solvent. This type is mainly used for the purpose of coating thickness increase. The second one is, as disclosed in U.S. Pat. Nos. 4,290,932 (Japanese Patent Application Laid-open No. 56-76,447), 4,377,661, 4,414,357, 4,477,536 and 4,598,111, is cross-linked polymer particles dispersed in a resinous solution which are prepared by the steps of: synthesizing by emulsion polymerization crosslinked polymer particles having ionic groups and polar groups on the surface; then, adding an azeotropic solvent to the resulting emulsion; and ① after coagulation dehydration and/or azeotropic dehydration, adding the resulting particles into the resin solution, ② after adding the emulsion to a solution polymerization batch of acrylic resins, conducting polymerization while azeotropically dehydrating or ③ after mixing the emulsion with the resin solution, conducting azeotropic dehydration. The thus obtained particles dispersions have been used mainly for aluminum pigment orientators of metallic coatings by utilizing interparticle hydrogen bonding force and ionic bonding force. Further, the third one is, as disclosed in Japanese Patent Application Publication No. 16,147/1968 and Japanese Patent Applications Laid-open Nos. 53-133,234 and 54-150,439, those obtained through deposition by polymerizing $\alpha,\beta$-ethylenically unsaturated monomers in organic solvents in the presence of amphipathic dispersion stabilizers. The obtained particles are used mainly for aluminum pigment orientators of metallic coatings and anti-sag.

However, the polymer non-aqueous dispersions obtained by those three processes have the following difficulties, respectively, and have not yet satisfied high coating performances as well as both qualities and appearances of coating films. Namely, in the polymer non-aqueous dispersions obtained by the processes of the first type, since the resinous surface active agents and fragments of water-soluble polymerization initiators used in the manufacturing processes remain therein, ionic groups remain on surfaces of the particles, which deteriorate water resistance and moisture resistance of coating films or are liable to adsorb onto pigments, causing pigment aggregation when the dispersions are used in coating compositions.

Further, in the polymer non-aqueous dispersions obtained by the processes of the second type, fixation on surface of surface active agents is prone to occur during the emulsion polymerization, due to grafting on particle surfaces of lipophilic groups of the surface active agents, entanglement of molecular chains, or the like and, additionally, fragments of water-soluble polymerization initiators are also fixed on the particle surfaces to provide ionicity. Further, even if the solvent addition and coagulation dehydration process is used that is the most feasible to remove the surface active agents among the processes for dehydrating the emulsions, these oil-soluble emulsifiers are apt to remain in the organic phase. Removal of such surface active agents and fragments of water-soluble polymerization initiators is very difficult. As is referred to in Journal of Colloid and Interface Science, Vol. 52, p. 479 (1979) and U.S. Pat. Nos. 4,461,870 and 4,530,946, it is deemed impossible to remove completely surface active agents used in the emulsion polymerization from surfaces of polymer particles.

Therefore, difficulties are encountered such that, when coating compositions are formulated with the dispersions, water resistance and moisture resistance of coating films are deteriorated and, moreover, since ionic groups are fixed on particle surfaces, pigment aggregation is prone to occur when the dispersions are used in pigment systems, and additionally, they are liable to corrode metallic containers during storage.

Further, in the polymer non-aqueous dispersions obtained by the processes of the third type, since polymer particle forming materials are limited from the synthetic point of view, polar groups are difficult to introduce onto the particle surfaces, so that they are inferior in flow control function based on interactions between the particles to those obtained by the processes of the first and second types. Furthermore, since dispersion stabilizers liable to be solvated with aliphatic solvents are employed, the particles cannot exist with stability in usual coating solvents having a relatively high polarity, so that they have difficulties such that fusion, deposition, swelling, dissolution, etc. of dispersed particles are liable to occur.

SUMMARY OF THE INVENTION

We, the inventors, as a result of assiduous studies of measures to obviate the above difficulties, have accomplished the present invention by obtaining polymer non-aqueous dispersions free from ionic substances and finding that use of these dispersions allows qualities and appearances of coating films to improve without affecting coating performances. The polymer non-aqueous dispersions free from ionic substances are obtained by producing crosslinked polymer particle aqueous dispersions through emulsion polymerization, using ester group containing surface active agents that have a chemical structure containing ester groups of an acid having hydrophilic groups and a hydroxyl compound having lipophilic groups (hereinafter referred to as "surfactants") and further using persulphates as a water-soluble polymerization initiator, and then by deionizing the particle surfaces through treatment under such conditions that all of the surfactants on the particle surfaces, sulphuric acid esters of water-soluble polymerization initiator fragments and free surfactants, but the particles themselves, are hydrolyzed, simultaneously converting the aqueous system to the non-aqueous system. Further, the inventors have found that flow control functions based on hydrogen bonding force of the particles and weatherability of coating films based on reactivity of the particles can be remarkably improved by providing core-shell type particle structures or extending segment chains having terminal hydroxyl groups outward from particles surfaces.

Namely, the process for preparing polymer non-aqueous dispersions according to the present invention is characterized by the steps of:

① emulsion polymerizing the following components:

(a) a hydroxyl group containing $\alpha,\beta$-ethylenically unsaturated monomer, (b) a polyfunctional $\alpha,\beta$-ethylenically unsaturated monomer, and (c) an $\alpha,\beta$-ethylenically unsaturated monomer other than the above (a) and (b), by using a water-soluble polymerization initiator in a soap-free system or in the presence of an ester group containing surface active agent; adding an organic solvent to a resultant polymer aqueous dispersion; and then adding a basic compound catalyst or an acidic compound catalyst thereto to hydrolyze completely said ester group containing surface active agent and water-soluble polymerization initiator at a temperature not exceeding 95° C. as in the condition of suspension;

② adding an acidic compound or basic compound to said suspension to neutralize said basic compound catalyst or acidic compound catalyst; then after adding a dispersion stabilizing resin, further adding an amine salt of organic acid, followed by leaving a system of said suspension to stand to separate into two layers, an organic layer and a water layer; after removing the water layer, washing the organic layer by adding water; adding an amine salt of an organic acid, followed by standing to separate; removing the water layer; and ③ removing residual water in the organic layer.

Polymer non-aqueous dispersions prepared by the above-mentioned process of the present invention have a total ionic group concentration (I), a hexane tolerance (HT) and a degree of swelling in acetone (S) which are in an interrelation as defined by the following equations:

$I < 2 \times 10^{-5}$ mol/g particle, $5 < HT < 50$ and $S < 10$.

Coating compositions formulated with the above polymer non-aqueous dispersions comprise 100 parts by weight of a resinous solid matter mixture consisting of 30~90% by weight of a polyol resin and 10~70% by weight of a curing agent reactable with hydroxyl group and 1~50 parts by weight of polymer particles in a polymer non-aqueous dispersion having the above-defined characteristics.

DETAIL DESCRIPTION OF THE INVENTION

In the process for preparing polymer non-aqueous dispersion according to the present invention, the emulsion polymerization may be performed by conventional processes, namely, processes wherein a mixture of $\alpha,\beta$-ethylenically unsaturated monomers is added to hot water containing a water-soluble polymerization initiator in a soap-free system or in the presence of a surfactant. However, as a manner of addition of the mixture of $\alpha,\beta$-ethylenically unsaturated monomers, gradual addition into the hot water is preferred in order to prevent interparticle crosslinking reactions during the polymerization.

The component (a) in the polymer non-aqueous dispersions to be employed in the process according to the present invention is an $\alpha,\beta$-ethylenically unsaturated monomer, such as 2-hydroxyethyl (meth)acrylate, 2-hydroxypropyl (meth)acrylate, 3-hydroxypropyl (meth)acrylate, glycerol (meth)acrylate or the like. These can be used alone or in combination arbitrarily. However, it is more preferable that the component (a) contains at least 5 mole % of one kind or a mixture of two kinds or more of $\alpha,\beta$-ethylenically unsaturated monomers having hydroxyl group terminated segment chains (hereinafter referred to as "an active hydroxyl group type monomer") as shown in the following formulae:

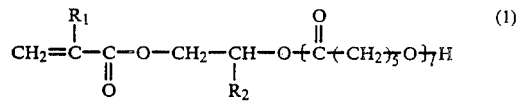
(1)

wherein $R_1$ and $R_2$ represent hydrogen atom or methyl group, and l is an integer of 1~10,

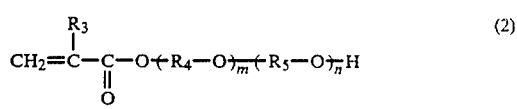
(2)

wherein $R_3$ is hydrogen atom or methyl group, $R_4$ and $R_5$ represent ethylene group or isopropylene group and $m+n$ is an integer of 2~15, and

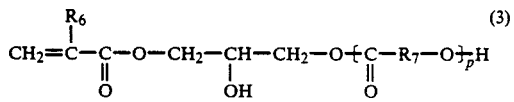

(3)

wherein $R_6$ is hydrogen atom or methyl group, $R_7$ is an alkylene group having $1\sim17$ carbon atoms and p is an integer of $1\sim10$.

Hereupon, since at least 5 mole % of the above active hydroxyl group type monomers contained in the component (a) augment extremely interparticle hydrogen bonding force, the component (a) can exhibit more excellent flow control functions. Additionally, the hydroxyl groups on the particle surfaces highly increase in reactivity to facilitate matrix formation by reacting strongly with curing agents in the coating films, so that weatherability of the formed coating films can be improved. Hereupon, in any case where l in the above formula (1) exceeds 10, m+n in the formula (2) exceeds 15 or p in the formula (3) exceeds 10, the active hydroxyl group type monomers decrease in copolymerizability, becoming hardly incorporated into the particles and so it is not preferable.

The active hydroxyl group type monomers shown in the above formula (1) can be readily manufactured by ring opening addition of $1\sim10$ moles of ε-caprolactone to 1 mole of 2-hydroxyethyl (meth)acrylate or 2-hydroxypropyl (meth)acrylate. Alternatively, these are commercially available as for example Placcels FM1, FM2, FM3, FM4, FM7 and FM10 (all trade names, manufactured by Daicel Chemical Industries, Ltd.) Hereupon, other than the active hydroxyl group type monomers shown in the formula (1), also employable are monomers manufactured by adding $1\sim10$ moles of other lactones, such as β-propiolactone, β-butylolactone, γ-butylolactone, pivalolactone, γ-valerolactone, δ-valerolactone or the like, to 1 mole of 2-hydroxyethyl (meth)acrylate or 2-hydroxypropyl (meth)acrylate. Further, the active hydroxyl group type monomers shown in the above formula (2) can be readily manufactured by ring opening addition of $2\sim10$ moles of ethylene oxide and/or propylene oxide to 1 mole of (meth)acrylic acid. Alternatively, these are commercially available as for example Blemmers PP 1000, PP 500, PP 800, PE 90, PE 200, PE 350 and PEP 350B (all trade names, manufactured by Nippon Oil & Fats Co., Ltd.). Further, the active hydroxyl group type monomers shown in the formula (3) can be readily manufactured by self-condensing $1\sim10$ moles of a hydroxycarboxylic acid having $2\sim18$ carbon atoms, such as glycolic acid, lactic acid, 12-hydroxy stearic acid or the like, and then esterifying the condensate compounds with glycidyl (meth)acrylate.

The component (b) of the polymer non-aqueous dispersions to be employed in the process of the present invention is a poly-functional α,β-ethylenically unsaturated monomer that is used for the purpose of firmly three-dimensional crosslinking of polymer particles in order to prevent, when used in coating compositions, swelling in solvent of the polymer fine particles and diffusion into the inside of the particles of hydroxyl groups on surfaces of the polymer particles. As such an α,β-ethylenically unsaturated monomer, mention may be made of, for example:
divinyl benzene,
diallyl phthalate,
diallyl terephthalate,
ethylene glycol di(meth)acrylate,
diethylene glycol di(meth)acrylate,
triethylene glycol di(meth)acrylate,
polyethylene glycol di(meth)acrylate,
1,4-butane diol di(meth)acrylate,
1,3-butylene glycol di(meth)acrylate,
1,6-hexane diol di(meth)acrylate,
neopentyl glycol di(meth)acrylate,
2-hydroxy-1,3-di(meth)acryloxy propane,
2,2-bis[4-(meth)acryloxyethoxy)phenyl]propane,
trimethylol propane tri(meth)acrylate,
tetramethylol methane tri(meth)acrylate,
pentaerythritol tri(meth)acrylate,
dipentaerythritol tri(meth)acrylate,
pentaerythritol tetra(meth)acrylate,
dipentaerythritol penta(meth)acrylate,
dipentaerythritol hexa(meth)acrylate,
tetramethylol methane tetra(meth)acrylate,
epoxy prepolymers,
urethane (meth)acrylates,
or the like. These may be used alone or in combination.

The component (c) of the polymer non-aqueous dispersions to be employed in the process of the present invention is a hydroxyl-free, nonionic α,β-ethylenically unsaturated monomer for forming the polymer particles that is different from the components (a) and (b). The component (c) may be used arbitrarily according to properties of the coating compositions to be formulated therewith, such as compatibility, refractive index, polarity or the like. However, if the component (c) is so selected, preferably as a known technique teaches (in "ABS Resin" p. 53, (1970), edited by Japan High Polymer Society, published by Maruzen Co.), that the difference in refractive index between the binder in the coating compositions and the polymer particles may be adjusted to be 0.005 or less, appearances and qualities of coating films can be improved. As such an α,β-ethylenically unsaturated monomer other than the components (a) and (b), mention may be made of, for example;
methyl (meth)acrylate,
ethyl (meth)acrylate,
n-propyl (meth)acrylate,
isopropyl (meth)acrylate,
n-butyl (meth)acrylate,
isobutyl (meth)acrylate,
t-butyl (meth)acrylate,
n-hexyl (meth)acrylate,
cyclohexyl (meth)acrylate,
2-ethylhexyl (meth)acrylate,
lauryl (meth)acrylate,
(meth)acrylamide,
(meth)acrylonitrile,
vinyl acetate,
vinyl propionate,
vinyl butyrate,
vinyl caproate,
vinyl 2-ethylhexanoate,
vinyl laurate,
vinyl stearate,
styrene,
α-methylstyrene,
vinyl toluene,
vinyl chloride,
vinylidene chloride,
dibutyl fumarate,
or the like. These may be used alone or in combination.

Further, the polymer non-aqueous dispersions according to the present invention which have a core-shell type particle structure can display further increased flow control functions and weatherability improving effects based on matrix formation of the particles by reaction with curing agents in the coating films. Such core-shell type particles can be obtained by effecting emulsion polymerization of 5 weight % or more of a mixture of the components (b) and (c) on the outset, and then subsequent core-shell type emulsion polymerization of the remainder of the components (b) and (c) mixture with the component (a). Hereupon, when the mixture of the components (b) and (c) at the first stage of the emulsion polymerization is in an amount of less than 5% by weight based on the total amount of the mixture, the abovementioned further increased flow control functions and weatherability improving effects will not be able to be expected.

In the emulsion polymerization, there are generally many cases where a water-soluble polymerization initiator is used. Such a water-soluble polymerization initiator, after radical fission, is deposited on the polymer particle surfaces, directing hydrophilic groups in the water-soluble polymerization initiator towards aqueous medium. Since the hydrophilic groups of the water-soluble polymerization initiator are generally ionic groups, when the polymer particles are formed by emulsion polymerization, ionic groups are introduced onto the polymer particle surfaces. Accordingly, in the polymer non-aqueous dispersions according to the process of the present invention, after the emulsion polymerization, the above water-soluble polymerization initiator fragments are subjected to a hydrolysis treatment to scission-remove the ionic groups from the particle surfaces in order to deionize the polymer particle surfaces. As such a water-soluble polymerization initiator of which ionic groups can be scission-removed from the particle surfaces by a hydrolysis treatment, particularly preferable are, for example, persulphates, such as sodium persulphate, potassium persulphate, ammonium persulphate or the like. These may be used alone or in combination. Needless to say, in this case, ferrous salts, acid sodium sulphite, N,N-dimethyl aniline or the like can be used in combination with the persulphates, as a redox polymerization initiating system.

Hereupon, the water-soluble polymerization initiators are used, in the case of a soap-free system, in an amount of 1~10% by weight of total α,β-ethylenically unsaturated monomers, and in the presence of surfactants, in an amount ranging 0.1~2% by weight. In the case of the soap-free system, if the water-soluble polymerization initiators are in an amount of less than 1% by weight, the polymer particles will aggregate due to poor emulsification, while in excess of 10% by weight, the polymer particles will also aggregate by salting-out, so that either case is not preferable. In the presence of surfactants, if less than 0.1% by weight, polymerization conversion will become so low that polymer particles are hardly produced, while in excess of 2% by weight, the polymer particles will aggregate by salting-out, so that either case is not preferable.

Further, the emulsion polymerization is performable both in a soap-free system and in the presence of surfactants. In the latter case, fixation on surface of active agents is prone to occur due to grafting on particle surfaces of lipophilic groups of the surfactants, entanglement of molecular chains, or the like, and the particle surfaces are ionized. Accordingly, in the polymer non-aqueous dispersions according to the present invention, in the case of the presence of surfactants, after the emulsion polymerization, the surfactants fixed on the surfaces are subjected to a hydrolysis treatment to scission-remove the ionic groups from the particle surfaces in order to deionize the polymer particle surfaces. As such a surfactant that can be scission-removed by hydrolysis treatments, particularly preferable are ester group containing surfactants. As an anionic surfactant, mention may be made of, for example, alkyl sulphates, monoalkyl sulfosuccinates, dialkyl sulfosuccinates, alkylether sulphates, polyoxyethylene alkylphenylether sulphates, alkyl phosphates, alkylether phosphates, and Na-salts, K-salts or amine salts of sulphonic acid compounds represented by the following formula:

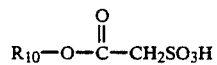

wherein $R_{10}$ is alkyl group having 12~18 carbon atoms. Those may be used alone or in combination. Additionally, the alkyl sulphates include, for example, sodium lauryl sulphate, sodium 2-ethylhexyl sulphate, or the like; the monoalkyl sulfosuccinates include, for example, sodium hexyl sulfosuccinate or the like; the dialkyl sulfosuccinates include, for example, sodium dihexyl sulfosuccinate, sodium di-2-ethylhexyl sulfosuccinate or the like; the alkylether sulphates include, for example, sodium polyoxyethylene laurylether sulphate or the like; the polyoxyethylene alkylphenylether sulphates include, for example, sodium polyoxyethylene octylphenylether sulphate or the like; the alkyl phosphates include, for example, potassium lauryl phosphate or the like; and the alkylether phosphates include, for example, potassium polyoxyethylene lauryl phosphate or the like. These may be used alone or in combination.

Further, as a cationic surfactant, mention maybe made of, for example, compounds represented by the following formula:

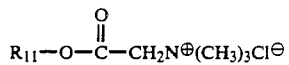

wherein $R_{11}$ is alkyl group having 12~18 carbon atoms. When the emulsion polymerization is conducted, it is preferred that the above surfactants is used in an amount yielding the concentration in water of 7% or less by weight. Hereupon, in the case where the concentration of the surfactants exceeds 7% by weight, ionic compounds produced by hydrolysis of the surfactants are liable to remain in the polymer non-aqueous dispersion to deteriorate water resistance of coating films, so that it is not preferable.

By such an emulsion polymerization, polymer particles having an average particle diameter of 10~5,000 nm can be obtained.

The polymer non-aqueous dispersions according to the present invention can be manufactured by subjecting the polymer particles thus formed by the emulsion polymerization process to the subsequent process to convert to a non-aqueous system.

Namely, on the outset, an organic solvent that causes neither dissolution nor aggregation of particles nor water separation is added to the polymer aqueous dispersions produced by the emulsion polymerization. Such an organic solvent desirably contains 20~100% by weight of an amphipathic organic solvent that is compatible with hydroxyl groups on particle surfaces. As such an amphipathic organic solvent, suitable are alcohols, ketones, ethers, glycol ethers, or the like, which can form hydrogen-bonds with hydroxyl groups on the particle surfaces to prevent interparticle aggregation. Hereupon, if the amphipathic organic solvent is in an amount of less than 20% by weight, the interparticle aggregation and water separation will occur so that it is no preferable.

As such an amphipathic organic solvent compatible with hydroxyl groups on particle surfaces, mention may be made of, for example, alcohols such as 2-ethyl-1-butyl alcohol, 3-heptyl alcohol, 1-octyl alcohol, 2-octyl alcohol, 2-ethylhexyl alcohol, 1-nonyl alcohol, 3,5,5-trimethyl-1-hexyl alcohol, 1-decyl alcohol, 1-undecryl alcohol, 1-dodecyl alcohol, n-butyl alcohol, n-pentyl alcohol, n-hexyl alcohol, secondary butyl alcohol, isobutyl alcohol, 2-pentyl alcohol, 4-methyl-2-pentyl alcohol, 3-pentyl alcohol, 2-methyl-1-butyl alcohol, or the like; ketones such as methyl-n-propyl ketone, methylisopropyl ketone, diethyl ketone, methyl-n-butyl ketone, methyl-isobutyl ketone, methyl-n-pentyl ketone, di-n-propyl ketone, di-isobutyl ketone, ethyl-n-butyl ketone, methylethyl ketone, or the like; ethers such as diethyl ether, dipropyl ether, di-isopropyl ether, dibutyl ether, dihexyl ether, dioxane, tetrahydrofuran, tetrahydropyran, 1,2-diethyloxy ethane, or the like; and glycol ethers such as 2-isopentyloxy ethanol, 2-hexyloxy ethanol, 2-phenoxy ethanol, or the like. These may be used alone or in combination.

Alternatively, organic solvents other than the above, namely, non-amphipathic organic solvents incompatible with hydroxyl groups on particle surfaces, are used in an amount of 0~80% by weight for the purpose of facilitating a process for removing residual water after conversion of particles to a non-aqueous system. Those are admixed to the aforementioned organic solvents until the solubility of water at 20° C. becomes preferably 5% or less, by weight. As such an organic solvent, mention may be made of, for example, aliphatic solvents such as n-pentane, n-hexane, n-heptane, cyclohexane, methyl cyclohexane, ethyl cyclohexane, or the like; aromatic solvents such as benzene, toluene, xylene, ethyl benzene, or the like; and esteric solvents such as ethyl acetate, n-propyl acetate, isopropyl acetate, n-butyl acetate, isobutyl acetate, secondary butyl acetate, or the like.

These can be used alone or in combination and are not limited to the above in the present invention.

Further, the polymer aqueous dispersions are admixed to the organic solvents in an amount ranging 5~90%, preferably 10~70% by weight of the total amount of the polymer aqueous dispersion and organic solvent. Hereupon, if the organic solvents are in an amount of less than 5% by weight, the polymer particles will aggregate to raise so high a viscosity of the system that stirring will become hardly performed efficiently, so that it is not preferable. Alternatively, if the amount is in excess of 90% by weight, a water layer will be separated from an organic layer whereby the hydrolysis reaction on the polymer particle surfaces will not proceed sufficiently, causing pigment aggregation in coating compositions and deterioration of water resistance, weatherability, etc. of coating films, so that it is not preferable.

After addition of the organic solvents to the polymer aqueous dispersions, a hydrolyzing process is then conducted. The hydrolyzing process aims to scission-remove ionic groups from particle surfaces to deionize the particles and then transfer completely these particles to the organic layer without aggregating. The hydrolysis reaction is performed at a temperature of not exceeding 95° C., preferably, 70°~95° C., in the presence of a basic compound catalyst when an anionic surfactant is used, an acidic compound catalyst when a cationic surfactant is used, or a basic or acidic compound catalyst in the case of a soap-free emulsion polymerization. Hereupon, if the reaction temperature exceeds 95° C., not only ionic groups on particle surfaces but also other ester group portions will be hydrolyzed to form carboxyl groups whereby the particle surfaces are ionized, so that it is not preferable. Alternatively, if the reaction temperature is lower than 70° C., it will take a long time to complete the hydrolysis reaction, so that it is not preferable.

Further, the basic compound catalysts or acidic compound catalysts are added in an amount of desirably 1~3 times the stoichiometric amount of ester groups to be hydrolyzed. If the amount is less than the stoichiometric, a degree of hydrolysis will become so low that ionic groups will be liable to remain on the particle surfaces, so that it is not preferable. Alternatively, if the amount exceeds 3 times, hydrolysis of (meth)acrylates constituting the particles will be commenced, producing carboxyl groups on the particle surfaces, so that it is not preferable. Hereupon, the "stoichiometric amount of ester groups to be hydrolyzed" is to be meant by the sum total of double amount of persulphates and total amount of ester groups of surfactants.

By performing the hydrolysis reaction under such conditions, the total ionic group concentration of the polymer particles can be made to be $2 \times 10^{-5}$ mol/g particle or less. Hereupon, as a basic compound catalyst, mention may be made of, for example, sodium hydroxide, potassium hydroxide, lithium hydroxide, tetramethyl ammonium hydroxide, tetraethyl ammonium hydroxide or the like, and as an acidic compound catalyst, for example, sulphuric acid, hydrochloric acid, p-toluene sulphonic acid, methane sulphonic acid, benzene sulphonic acid or the like. A progress degree of hydrolysis can be followed by neutralization titration, etc. of consumption of the basic compound catalyst or acidic compound catalyst added and the end-point of titration can be found easily.

After completion of the hydrolysis reaction, a neutralization reaction is conducted according to the conventional method, with an acidic compound same as the aforementioned acidic compound catalysts in the case of a system wherein the basic compound catalyst has been used, and with a basic compound same as the aforementioned basic compound catalysts in the case where the acidic compound catalyst has been used, and thereafter 20~200 parts by weight, as resinous solid matter, of a dispersion stabilizing resin are added to 100 parts by weight of the polymer particles to stabilize the particle dispersion. The dispersion stabilizing resin to be used herein is preferred to have compatibility with binders of coating films. As such a dispersion stabilizing resin, any one or mixtures of acrylic resins, alkyd resins and polyester resins having essentially hydroxyl groups, or any one or mixtures of amino resins such as melamine resins, benzoguanamine resins, urea resins, glycoluryl resins and the like, are preferred.

Additionally, if the dispersion stabilizing resin is in an amount as resinous solid matter of less than 20 parts by weight based on 100 parts by weight of the particles, there may be the case where the dispersion stability of the particles is so much decreased that the particles coalesce at gas-liquid interfaces, etc. in the reactor. Alternatively, if in excess of 200 parts by weight, efficiency of separation into two layers consisting of an organic layer containing the polymer particles and a water layer will be lowered, so that it is not preferable.

After addition of the dispersion stabilizing resin, an amine salt of organic acid is further added to the system and then stirring is stopped, followed by leaving the system to stand to separate into two layers: a resinous solution layer (organic layer) containing the particles and a water layer containing ionic substances. The ionic substances mentioned here include hydrolysis reaction products of surfactants and water-soluble polymerization initiator fragments; basic compound catalysts and acidic compound catalysts added in the hydrolysis reaction and neutralization reaction; or salts produced in the neutralization reaction. Hereupon, it is preferred to warm up the system with the intention of furtherance of water separation, and by maintaining the temperature of the system in the range between 50° C. and 80° C., water separation efficiency can be raised.

The organic acids to be used in the amine salt of organic acid to be added here include, for example, carboxylic acids such as formic acid, acetic acid, propionic acid, oxalic acid, malonic acid or the like; sulphonic acids such as methane sulphonic acid, ethane sulphonic acid or the like; and organophosphoric acids such as monomethyl phosphoric acid, monoethyl phosphoric acid, dimethyl phosphoric acid, diethyl phosphoric acid or the like. Alternatively, as the amines, those having a boiling point of 150° C. or less are particularly preferred, and mention may be made of, for example, primary amines such as monoethylamine, propylamine, isopropylamine, n-butylamine, isobutylamine, secondary butylamine, t-butylamine, pentylamine or the like; secondary amines such as dimethylamine, diethylamine, dipropylamine, diisopropylamine, diisobutylamine, dipentylamine or the like; and tertiary amines such as trimethylamine, triethylamine, tripropylamine, tributylamine, pyridine or the like. However, the organic acids and amines to be employed in the present invention are not specifically limited to the above. Hereupon, if amines having a boiling point of higher than 150° C. are used, there may be the case where the amines remain in polymer non-aqueous dispersions to deteriorate properties of coating films, such as water resistance, etc.

The amine salts of organic acid consisting of a combination of the above organic acid and amine can be readily manufactured by mixing predetermined amounts of the organic acid and amine in the presence of water at normal temperatures. Further, it is appropriate that the amine salts of organic acid are added in an amount ranging 0.1~10%, preferably 1~5%, by weight, based on the water existing in the system. If it is less than 0.1% by weight, the efficiency of separation into water layer and organic layer will be lowered, while if in excess of 10% by weight, the amine salts of organic acid are liable to remain in polymer non-aqueous dispersions, thereby deteriorating properties of coating films, such as water resistance, etc. so that either case is not preferable.

Next, after removing the water layer, ionic substances remaining in the organic layer is washed off with water and then after the above amine salt of organic acid is added, the organic layer is left to stand to separate and remove the washing water. The water-washing process is repeated until pH of the separating and removing water layer reaches 5~8 and ionic substances remaining in the organic layer decrease to 50 ppm or less. Hereupon, if the pH of the water layer to be separated and removed is lower than 5 or exceeds 8, or the ionic substances remaining in the organic layer exceed 50 ppm, the properties of coating films, such as water resistance or the like, will be deteriorated, so that either case is not preferable.

Further, if the residual water is reduced to 5% by weight in the organic layer after washing with water, removal of the residual water in the subsequent process can be facilitated.

The residual water in the organic layer can be removed by the following methods:
 (a) distillation of the water under vacuum,
 (b) removal by decomposition through reactions with compounds,
 (c) water-absorbing treatment with a water-absorbent, or
 (d) removal of water by azeotropy or spray drying.

The method (a) is a method wherein only water is distilled out at 50°~100° C. under a reduced pressure of less than 760 mmHg, as the system is not forming azeotropic mixture with water. The method (b) is a method wherein orthocarboxylic acid esters, such as methyl orthoformate, ethyl orthoformate, methyl orthoacetate, ethyl orthoacetate or the like, or diketene, formamide, dicyclohexyl carbodiimide or the like is added and the residual water is decomposed by reacting therewith at 30°~90° C. If the reaction temperature is lower than 30° C., the water decomposition will require a long time, while if in excess of 90° C., moisture will condense at vacant spaces in the reactor, rather resulting in insufficient water-removal, so that either case is not preferable. In this water removing method, low boiling point solvents are by-produced as decomposition products, such as methyl alcohol, ethyl alcohol, methyl formate, ethyl formate, methyl acetate, ethyl acetate or the like, when the orthocarboxylic acid esters are used, or such as acetone or the like, when the diketene is used. Therefore, it is preferred that these low boiling point solvents are distilled off under vacuum, after the water decomposition reaction, for the purpose of preventing popping of coating films. Further, ammonium formate when the formamide is used, or dicyclohexyl urea when dicyclohexyl carbodiimide is used, is by-produced, such a decomposition product is required to be separated by filtration after the water decomposition reaction. The method (c) is a method wherein the organic layer is passed through a column filled with polymer water absorbents, such as Sumika Gel S-50, SP-520, N-100, Np-1020, F-03, F-03, F-51 or F-75 (all trade names, manufactured by Sumitomo Chemical Co., Ltd.), Aquakeep 4S or 10HS (both trade names, manufactured by Seitetsu Kagaku Co., Ltd.) or molecular sieves, or a method wherein any one of or a mixture of the above polymer water absorbents, molecular sieves or dehydrates of inorganic salts such as sodium sulphate, calcium chloride, calcium oxide or the like is admixed with the organic layer and, after stirring, separated by filtration. The method (d) is a water removing method that has been generally used to obtain dry particles after emulsion polymerization, as is for example referred to British Patent No. 967,051, page 5, wherein organic solvents capable to form an azeotropic mixture with water are added and water is azeotropically distilled off at 50°~100° C. Alternatively, it is a method wherein the organic layer is sprayed at 20°~100° C. from a nozzle to vaporize water with organic solvent and then drying residue is dispersed again in the organic solvent.

The method (b) among the other water removing methods is characterized by a simple process having an extremely high degree of dehydration. This method allows nearly all of adsorbed water to remove, whereas according to the other water removing methods water adsorbed and coordinated on particle surfaces are hardly removed.

Meanwhile, the polymer particles are preferably contained in polymer non-aqueous dispersions in an amount ranging 2~50% by weight. If it is less than 2% by weight, the flow control function becomes so deficient that improvements in appearance and quality of coating films cannot be attained, so that it is not preferable.

If it exceeds 50% by weight, the polymer non-aqueous dispersions become so high viscous during manufacture that aggregates of the polymer particles are prone to be formed and when coating compositions are formulated therewith the polymer particles are apt to aggregate as well, so that it is not preferable.

The thus obtained polymer non-aqueous dispersions are desirably designed to have a total ionic group concentration (I) of polymer particles in the polymer non-aqueous dispersions, a hexane tolerance (HT) and a degree of swelling in acetone (S) which are in ranges satisfying the following relations, respectively:

$$I < 2 \times 10^{-5} \text{ mol/g particle;} \quad (4)$$

$$5 < HT < 40 \quad (5)$$

$$S < 10 \quad (6)$$

The total ionic group concentration of polymer particles can be determined according to the following method. Namely, the obtained polymer non-aqueous dispersion is diluted with a mixed solvent of acetone/water=9/1 (by weight) so that non-volatile matter may become in an amount of 10% by weight. This diluted dispersion is passed through a column filled with ion-exchange resins to ion-exchange all of surfactants and water-soluble polymerization initiator fragments remaining in the dispersion and then a total ionic group concentration of dispersion is quantitatively determined by potentiometric titration. Then, with respect to dispersion stabilizing resins used in the manufacture of the polymer non-aqueous dispersion, an ionic group concentration is determined by potentiometric titration. The total ionic group concentration of polymer particles can be calculated by subtracting the ionic group concentration corresponding to the dispersion stabilizing resins from the total ionic group concentration of dispersion obtained by the above procedures.

The total ionic group concentration in the relation shown by the inequality (4) can be attained, as described in the above manufacturing process, by scission-removing by hydrolysis of surfactants and water-soluble polymerization initiator fragments deposited on polymer particle surfaces under such conditions that polymer particles themselves are not hydrolyzed, to thereby ionize particle surfaces. Hereupon, if the total ionic group concentration of polymer particle is $2 \times 10^{-5}$ mol/g particle or more, the polymer particles and pigments will aggregate due to electric attraction force to deteriorate appearances of coating films as well as to increase hydrophilicity of the polymer particle surfaces to deteriorate water resistance of coating films, so that it is not preferable.

The hexane tolerance of polymer particles can be determined according to the following method. Namely, to the polymer aqueous dispersion obtained by emulsion polymerization, ethyl acetate is added in an amount of 19 times polymer particles, by weight, and after stirring, KBr is further added to separate by salt-out the system into two layers. The separated water layer is then removed. After adding mirabilite to ethyl acetate layer to effect residual water absorbing treatment, the mirabilite is separated by filtration to obtain an ethyl acetate layer wherein polymer particles having non-volatile matter of 5% by weight are dispersed. To 20 parts by weight of this ethyl acetate layer, n-hexane is added until the polymer particles aggregate resulting in a whitish tinted system. The amount of the n-hexane added to 1 part by weight of the polymer particles in the above case is denoted as a hexane tolerance (HT).

The HT of polymer particles has a close relation with polarity of polymer particle surfaces, and the lower the HT, the higher the polarity. The HT can satisfy the relation defined by the inequality (5) by adjusting, in the above manufacturing process, the component (a) (contents of hydroxyl group containing $\alpha,\beta$-ethylenically unsaturated monomers and active hydroxyl group type monomers) and particle structures (homogeneous particles or core-shell type particles) so that in the case of the homogeneous particles, the component (a) may be in the range of 1~50% by weight of the sum total of the components (a), (b) and (c) or in the case of the core-shell type particles, in the range of 1~50% by weight of the sum total of the components (a), (b) and (c) in the shell component. Hereupon, if the HT is 40 or more, the polarity of the polymer particle surfaces is so low that an expected degree of flow control functions based on interparticle hydrogen bonding force will not be obtained and the reactivity of particle surfaces with curing agents also will be decreased resulting in insufficient matrix formation in coating films of the polymer particles, so that it is not preferable. Alternatively, if the HT is 5 or less, the polarity of the polymer particle surfaces is so high that compatibility with binders will become insufficient and there may be the case of rather deteriorating appearances of coating films.

The degree of swelling in acetone of polymer particles can be determined based on the method described in a known literature, Journal of Coating Technology, p. 33, vol. 52, No. 669, October (1980). Namely, the polymer aqueous dispersion obtained by emulsion polymerization is dropped and dispersed in acetone so that the polymer particle concentration may be 4 g/l, and the degree of swelling in acetone of polymer particles is found by substituting the viscosity of the dispersion measured in the following equation:

$$S = \frac{\rho_p (\sqrt{6.25 + 25(\eta_s - \eta_o/\eta_o} - 2.5)}{12.5\,m}$$

wherein,
  $\rho_p$: density of polymer particles in dry condition,
  $\eta_s$: viscosity of dispersion in acetone,
  $\eta_o$: viscosity of solvent portion of dispersion in acetone, and m: weight of solid matter of polymer particles in 1 cm³ of dispersion in acetone.

The degree of swelling in acetone (S) of polymer particles has a close relation with the degree of cross-linking of the polymer particles, and the lower the S, the higher the degree of cross-linking. The S can satisfy the relation defined by the inequality (6) by adjusting, in the above manufacturing process, the content of the component (b) to be in the range of 2~80%, preferably 5~50%, by weight, based on the sum total of the components (a), (b) and (c) in either case of homogeneous particles and core-shell type particles. By making the S of polymer particles less than 10 by using 2~80% by weight of the component (b), the range of selection of solvent is very much widened when the system is converted to the non-aqueous system in the above manufacturing process or when formulation of coating compounds so that the degree of freedom of workability in the manufacture of coating compositions. Hereupon, if the S is 10 or more, at the step beginning with the addition of an organic solvent in the above manufacturing process, the viscosity of the system will increase so high that the hydrolysis treatment requires a long time and scales become apt to deposit on walls of the treating bath, so that it is not preferable.

The polymer particles having the above characteristics are used in an amount ranging 1~50 parts, preferably 3~30 parts, by weight, based on 100 parts by weight of resinous solid matter of binder in coating composition. Hereupon, if the polymer particles are in an amount of less than 1 part by weight, the flow control functions will become so deficient that improvements in appearance and quality of coating films cannot be attained, so that it is not preferable. Alternatively, if in excess of 50 parts by weight, the flow control functions will be so much augmented inversely that there may be the case of impairing smoothness of coating film surfaces, so that it is not preferable.

The binder components of coating compositions according to the present invention are composed of 30~90% by weight of a polyol resin and 10~70% by weight of a curing agent to react with hydroxyl groups. Hereupon, if the polyol resin is in an amount of less than 30% by weight, chemical resistance of the formed coating films will be deteriorated, while in excess of 90% by weight, water resistance of the formed coating films will be also deteriorated, so that either case is not preferable. As a polyol resin, particularly preferable are acrylic resins, alkyd resins or polyester resins. These may be used alone or in combination.

Additionally, as a curing agent to react with hydroxyl groups, mention may be made of amino resins such as melamine resins, benzoguanamine resins, urea resins, glycoluryl resins and the like, or isocyanate compounds. These may be used alone or in combination.

In order to formulate coating compositions according to the present invention, use may be made of conventional apparatuses to be generally used in the manufacture of coating compositions, such as dissolvers, ball mills, paint shakers, sand mills, attritors, roll mills, kneaders or the like. Then, if required, coloring agents such as pigments, dyes, glass flakes, aluminum flakes or the like, and also other additives usually employed in coating compositions, such as pigment dispersants, viscosity modifiers, leveling agents, curing catalysts, anti-gelling agents, UV absorbers, radical scavengers, or the like, may be added.

The coating compositions obtained according to the above process are applied by a usual coating method, such as air spray coating, airless spray coating, electrostatic coating, dip coating or the like, on usual objects to be coated, for example, inorganic materials such as metal or the like, or organic materials such as plastics or the like, and then dried at 60°~180° C. for 20~60 minutes, whereby excellent coating films are obtained.

In the polymer non-aqueous dispersions according to the present invention, surfactants and water-soluble polymerization initiator fragments used in emulsion polymerization thereof have been scission-removed by hydrolysis treatment from polymer particle surfaces and cleared from the system, so that these polymer particles surfaces have been turned to non-ionic. Therefore, the coating compositions of the present invention, different from those comprising conventional polymer non-aqueous dispersions, can obviate entirely defects of coating films such as pigment aggregation based on surface charge of particles, deterioration of water resistance and weatherability based on content of hydrophilic substances, or the like.

Furthermore, when the particles are formed into a core-shell type structure and/or a structure having hydroxyl group terminated segment chains extending outward from the particle surfaces, hydroxyl groups on particle surfaces increase in hydrogen bonding force and reactivity with curing agents, so that they can display further augmented flow control functions (functions for controlling metallic pigment orientation and anti-sagging) and weatherability improving effects based on matrix formation of these particles in coating compositions. Accordingly, the coating compositions according to the present invention are remarkably improved in appearance, quality and weatherability of coating films, as compared with those wherein conventional polymer non-aqueous dispersions are employed.

The present invention will be further explained in more detail by way of example and comparative example hereinafter. In examples, parts and percentages are by weight, unless otherwise specified.

1-A. MANUFACTURE OF POLYMER AQUEOUS DISPERSION (IN THE PRESENCE OF SURFACTANTS)

Manufacturing Example A1

| Surfactant aqueous solution | |
|---|---|
| Deionized water | 380 parts |
| Rapisol B90 (Note 1) | 7.4 parts |
| Polymerization initiator aqueous solution 1 | |
| Deionized water | 10 parts |
| Sodium persulphate | 0.25 parts |
| Particle-forming α,β-ethylenically unsaturated monomer mixture | |
| 2-Hydroxyethyl methacrylate | 1.2 parts |
| Ethylene glycol dimethacrylate | 3 parts |
| Styrene | 15 parts |
| n-Butyl methacrylate | 80.8 parts |
| Polymerization initiator aqueous solution 2 | |
| Deionized water | 10 parts |
| Sodium persulphate | 0.25 parts |

Note (1)
Rapisol B90: trade name of sodium di-2-ethylhexyl sulphosuccinate, manufactured by Nippon Oil & Fats Co., Ltd.; active ingredient, 90%.

A flask equipped with a stirrer, a reflux condenser, a couple of dropping funnels, a nitrogen introducing tube and a thermometer, was charged with surfactant aqueous solution and after raising the temperature to 80° C. under nitrogen stream, polymerization initiator aqueous solution 1 was added. After the temperature had resumed 80° C., as the temperature of the mixture in the flask was kept at 80°±2° C., the particle-forming α,β-ethylenically unsaturated monomer mixture was added dropwise taking 3 hours. From 1 hour after the commencement of the addition and parallel with the addition of this monomer mixture, the polymerization initiator aqueous solution 2 was also added dropwise taking 2 hours. After completion of the addition of the particle-forming α,β-ethylenically unsaturated monomers and polymerization initiator aqueous solution 2, polymerization was further performed at 80° C. for 2 hours to provide polymer aqueous dispersion A1. With respect to the obtained polymer aqueous dispersion, determined values of non-volatile matter, viscosities measured with Brookfield type viscometer at 20° C. and 60 rpm, and average particle diameters measured with "AUTOSIZER" (trade name) manufactured by Malvern, are shown in Table 1.

(i) Determination of Hexane Tolerance

One hundred parts of the polymer aqueous dispersion A1 and 380 parts of ethyl acetate were added to a beaker and stirred. Then, the mixture was transferred to a separatory funnel and 10 parts of 20% KBr aqueous solution were added thereto to salt-out and separate into two layers. The separated water layer was removed. The ethyl acetate layer was transferred to an Erlenmeyer flask, admixed with mirabilite and left to stand overnight to effect water-absorbing treatment of residual water. Then, the mirabilite was separated by filtration to provide a highly transparent ethyl acetate layer wherein polymer particles having 5% non-volatile matter are dispersed. Twenty parts of this ethyl acetate layer were put in an Erlenmeyer flask and while stirring with a stirrer, n-hexane was added slowly with a burette. At the time when 38 parts of n-hexane had been added to 1 part of polymer particles, the system became cloudy. This amount of the n-hexane added was to represent "Hexane Tolerance".

(ii) Determination of Degree of Swelling in Acetone

Two parts of the polymer aqueous dispersion A1 were added to 98 ml of acetone and dispersed therein. This dispersion in acetone was measured with a Lipkin-Davison type pycnometer for the density ($\rho_s$) at 20° C. and with Cannon-Fenske viscometer for the kinematic viscosity ($\nu_s$) at 20° C.
$\rho_s = 0.8055$ g/ml
$\nu_s = 0.4860$ cst
Using these $\rho_s$ and $\nu_s$, the viscosity of the dispersion in acetone ($\eta_s$) was found from the following equation:

$$\eta_s = \rho_s \cdot \nu_s = 0.3915 \text{ cps}$$

Further, about 12 parts of the dispersion in acetone were weighed accurately, and after air-dried on a petri dish at 20° C. for 1 day, further dried at 50° C. for 3 hours under a vacuum of 0.2 mmHg. Then, by measuring the solid material weight, the weight of the solid matter per 1 g of the dispersion in acetone ($W_s$) was found.
$W_s = 0.0052$
Alternatively, about 12 parts of the dispersion in acetone were weighed accurately, centrifugalized at 15,000 rpm for 1 hour. The density ($\rho_o$), kinematic viscosity ($\nu_o$) and weight of solid matter per 1 g of dispersion in acetone ($W_o$), of the solvent portion were determined in the same manner as the above.

$\rho_o = 0.7942$ g/ml $\nu_o = 0.4586$ cst $\eta_o = \rho_o \cdot \nu_o = 0.3642$ cps $W_o = 0.0008$ g Using the obtained $\rho_s$, $W_s$ and $W_o$, the weight of the solid matter of polymer particles in 1 cm³ of dispersion in acetone (m) was found from the following equation:

$$m = \rho_s(W_s - W_o) = 0.0035 \text{ g/ml}$$

Further, the density of polymer particles in dry condition ($\rho_p$) was found according to the following method. The polymer aqueous dispersion A1 was measured with a Lipkin-Davison type pycnometer for the viscosity ($\rho_l$) at 20° C.
$\rho_l = 1.0213$ g/ml
From the obtained $\rho_l$, $\rho_p$ was found from the following equation:

$$\rho_p = \frac{\rho_l \rho_w W_1/100}{\rho_w - \rho_l(1 - W_1/100)} = 1.1180 \text{ g/ml}$$

wherein,
$\rho_w$: density of water at 20° C. (0.9982 g/ml) and
$W_l$: non-volatile matter of polymer aqueous dispersion A1 (21.1%)
Using the above obtained $\rho_p$, $\eta_s$, $\eta_o$ and m, the degree of swelling in acetone (S) was found according to the following equation:

$$S = \frac{\rho_p(\sqrt{6.25 + 25(\eta_s - \eta_o)/\eta_o} - 2.5)}{12.5 m} = 9.0$$

Manufacturing Examples A2~A15

Using the same apparatuses as those used in Manufacturing Example A1, the procedure in Manufacturing Example A1 was followed based on the formulations A2~A15 shown in Table 1, and polymer aqueous dispersions having characteristics shown in Table 1, respectively, were obtained. These dispersions were analyzed and measured for hexane tolerance and degree of swelling in acetone by exactly the same method as described in Manufacturing Example A1, (i) and (ii). The obtained measured values are shown in Table 1, respectively.

2-A. MANUFACTURE OF POLYMER AQUEOUS DISPERSION (CORE-SHELL TYPE EMULSION POLYMERIZATION)

Manufacturing Example A16

| Surfactant aqueous solution | |
|---|---|
| Deionized water | 380 parts |
| Rapisol B90 (Note 1) | 7.4 parts |
| Polymerization initiator aqueous solution 1 | |
| Deionized water | 10 parts |
| Potassium persulphate | 0.25 parts |
| Core-forming α,β-ethylenically unsaturated monomer mixture | |

-continued

| | |
|---|---|
| Trimethylol propane triacrylate | 6 parts |
| Styrene | 9 parts |
| n-Butyl methacrylate | 12 parts |
| Shell-forming α,β-ethylenically unsaturated monomer mixture | |
| 2-hydroxypropyl methacrylate | 10 parts |
| Trimethylol propane triacrylate | 14 parts |
| Styrene | 21 parts |
| n-Butyl methacrylate | 28 parts |
| Polymerization initiator aqueous solution 2 | |
| Deionized water | 10 parts |
| Potassium persulphate | 0.25 parts |

The same flask as that used in Manufacturing Example A1 was charged with the surfactant aqueous solution and after raising the temperature to 80° C. under nitrogen stream, polymerization initiator aqueous solution 1 was added. After the temperature had resumed 80° C., as the temperature of the mixture in the flask was kept at 80°±2° C., the core-forming α,β-ethylenically unsaturated monomer mixture was added dropwise taking 43 minutes and subsequently the shell-forming α,β-ethylenically unsaturated monomer mixture was added dropwise taking 137 minutes. From 1 hour after the commencement of the addition of the core-forming α,β-ethylenically unsaturated monomer mixture, the polymerization initiator aqueous solution 2 was also added dropwise taking 2 hours, parallel with the addition of the shell-forming α,β-ethylenically unsaturated monomer mixture. After completion of the addition of the α,β-ethylenically unsaturated monomers and polymerization initiator aqueous solution 2, polymerization was further performed at 80° C. for 2 hours to provide polymer aqueous dispersion A16. The non-volatile matter, viscosity and average particle diameter of the obtained polymer aqueous dispersion are shown in Table 2.

Further, the dispersion A16 was analyzed and measured for hexane tolerance and degree of swelling in acetone by exactly the same method as described in Manufacturing Example A1, (i) and (ii). The obtained measured values are shown in Table 2.

Manufacturing Examples A17~A22

Using the same apparatuses as those used in Manufacturing Example A1, and following the procedure in Manufacturing Example A16, based on the formulations A17~A22 shown in Table 2, polymer aqueous dispersions having characteristics shown in Table 2, respectively, were obtained. However, the time required for adding the core- and shell-forming α,β-ethylenically unsaturated monomer mixtures was made to total 3 hours and the time for adding each mixture was made to correspond to the proportion of the monomers occupying the whole mixture.

These dispersions were analyzed and measured for hexane tolerance and degree of swelling in acetone by exactly the same method as described in Manufacturing Example A1, (i) and (ii). The obtained measured values are shown in Table 2, respectively.

TABLE 1

Unit: part

| | Manufacturing Example | | | | | | | |
|---|---|---|---|---|---|---|---|---|
| | A1 | A2 | A3 | A4 | A5 | A6 | A7 | A8 |
| Deionized water | 400 | 400 | 400 | 400 | 400 | 400 | 400 | 400 |
| Surfactant (1) | Rapisol B90 7.4 | Sintrex L-100 8.6 | Sintrex EHR 7.0 | Sintrex EHR 7.0 | Rapisol B90 7.4 | Rapisol B90 7.4 | Rapisol B90 7.4 | Aerosol MA80 7.3 |
| Water-soluble polymerization initiator | $Na_2S_2O_8$ 0.5 | $Na_2S_2O_8$ 0.5 | $Na_2S_2O_8$ 0.5 | $Na_2S_2O_8$ 0.5 | $Na_2S_2O_8$ 0.5 | $K_2S_2O_8$ 0.5 | $K_2S_2O_8$ 0.5 | $K_2S_2O_8$ 0.5 |
| α,β-ethylenically unsaturated monomer (2) | | | | | | | | |
| Component (a) | HEMA 1.2 | HEMA 2.3 | HEMA 4.6 | HEMA 4.6 | HEMA 9.2 | HEMA 9.2 | HEMA 18.5 | HEMA 18.5 |
| Active hydroxyl type monomer (mol. %) | 0 | 0 | 0 | 0 | 0 | 0 | 0 | 0 |
| Component (b) | EGDM 3 | EGDM 5 | EGDM 10 | EGDM 15 | DEGDM 20 | DEGDM 30 | DEGDM 20 | DEGDM 40 |
| Component (c) | St 15 BMA 80.8 | St 15 BMA 77.7 | St 15 EHMA 70.4 | St 15 EHMA 65.4 | St 30 i-BMA 40.8 | St 30 i-BMA 30.8 | St 30 MMA 31.5 | St 30 MMA 11.5 |
| Non-volatile matter (%) (3) | 21.1 | 20.8 | 21.3 | 21.1 | 20.8 | 20.7 | 21.1 | 21.2 |
| Viscosity (cps) (4) | 28 | 32 | 37 | 39 | 50 | 54 | 65 | 63 |
| Average particle dia. (nm) (5) | 72 | 64 | 48 | 39 | 42 | 38 | 40 | 35 |
| Hexane tolerance (6) | 38 | 32 | 27 | 27 | 19 | 20 | 7 | 8 |
| Degree of swelling in acetone (7) | 9.0 | 4.4 | 3.2 | 2.8 | 2.6 | 2.2 | 2.6 | 2.1 |

Unit: part

| | Manufacturing Example | | | | | | |
|---|---|---|---|---|---|---|---|
| | A9 | A10 | A11 | A12 | A13 | A14 | A15 |
| Deionized water | 400 | 400 | 400 | 400 | 400 | 400 | 400 |
| Surfactant (1) | Aerosol MA80 7.3 | Aerosol MA80 7.3 | Aerosol MA80 7.3 | Aerosol AY65 8.3 | Aerosol AY65 8.3 | Aerosol AY65 8.3 | Aerosol A268 11.5 |
| Water-soluble polymerization initiator | $K_2S_2O_8$ 0.5 | $K_2S_2O_8$ 0.5 | $K_2S_2O_8$ 0.5 | $(NH_4)_2S_2O_8$ 0.5 | $(NH_4)_2S_2O_8$ 0.5 | $(NH_4)_2S_2O_8$ 0.5 | $(NH_4)_2S_2O_8$ 0.5 |
| α,β-ethylenically unsaturated monomer (2) | | | | | | | |
| Component (a) | FM1 10 | HEMA 10 FM4 | HEMA 5 FM4 | HEMA 5 Blemmer PP1000 | Blemmer PE90 10 | GMA/Glycolic acid 10 | Blemmer GLM 1 GMA/(Lactic |

TABLE 1-continued

|  |  |  |  |  |  |  |  |
|---|---|---|---|---|---|---|---|
|  |  | 10 | 35 | 20 |  |  | acid)₈ |
|  |  |  |  |  |  |  | 7 |
| Active hydroxyl type monomer (mol. %) | 100 | 18 | 61 | 56 | 100 | 100 | 60 |
| Component (b) | DVB | DVB | DVB | DVB | TMPT | TMPT | TMPT |
|  | 18 | 18 | 18 | 18 | 15 | 15 | 15 |
| Component (c) | St | St | St | St | St | St | St |
|  | 5 | 5 | 5 | 5 | 15 | 15 | 15 |
|  | BMA | BMA | BMA | CHMA | CHMA | MMA | i-BMA |
|  | 67 | 57 | 37 | 52 | 60 | 60 | 62 |
| Non-volatile matter (%) (3) | 21.3 | 20.9 | 20.8 | 21.4 | 21.5 | 20.9 | 21.1 |
| Viscosity (cps) (4) | 62 | 58 | 60 | 54 | 48 | 51 | 45 |
| Average particle dia. (nm) (5) | 53 | 43 | 45 | 51 | 40 | 43 | 38 |
| Hexane tolerance (6) | 19 | 10 | 9 | 11 | 16 | 18 | 25 |
| Degree of swelling in acetone (7) | 3.0 | 3.1 | 3.1 | 3.0 | 2.7 | 2.6 | 2.6 |

TABLE 2

Unit: part

| | Manufacturing Example | | | | | | |
|---|---|---|---|---|---|---|---|
| | A16 | A17 | A18 | A19 | A20 | A21 | A22 |
| Deionized water | 400 | 400 | 400 | 400 | 400 | 400 | 400 |
| Surfactant 1) | Rapisol B90 | Rapisol B90 | Rapisol B90 | Aerosol MA80 | Aerosol MA80 | Aerosol AY65 | Aerosol AY65 |
|  | 7.4 | 7.4 | 7.4 | 7.3 | 7.3 | 8.3 | 8.3 |
| Water soluble polymerization initiator | $K_2S_2O_8$ | $K_2S_2O_8$ | $K_2S_2O_8$ | $Na_2S_2O_8$ | $Na_2S_2O_8$ | $(NH_4)_2S_2O_8$ | $(NH_4)_2S_2O_8$ |
|  | 0.5 | 0.5 | 0.5 | 0.5 | 0.5 | 0.5 | 0.5 |
| Core-forming α,β-ethylenically unsaturated monomer | | | | | | | |
| Component (b) | TMPT | TMPT | EGDM | DEGDM | TMPT | EGDM | DEGDM |
|  | 6 | 0.4 | 15 | 32 | 6 | 15 | 32 |
| Component (c) | St | St | St | St | St | St | St |
|  | 9 | 3 | 15 | 24 | 9 | 15 | 24 |
|  | BMA | BMA | CHMA | MMA | BMA | CHMA | MMA |
|  | 12 | 6.3 | 15 | 18.4 | 12 | 15 | 18.4 |
| Shell-forming α,β-ethylenically unsaturated monomer 2) | | | | | | | |
| Component (a) | HPMA | HPMA | HPMA | HPMA | HPMA | HPMA | HPMA |
|  | 10 | 3 | 10 | 7 | 5 | 5 | 5 |
|  |  |  |  |  | FM10 | Blemmer-70PEP350B | GMA/(12HSA)₃ |
|  |  |  |  |  | 5 | 5 | 2 |
| Active hydroxyl type monomer (mol. %) | 0 | 0 | 0 | 0 | 10 | 20 | 5 |
| Component (b) | TMPT | TMPT | EGDM | DEGDM | TMPT | EGDM | DEGDM |
|  | 14 | 3.6 | 15 | 8 | 14 | 15 | 8 |
| Component (c) | St | St | St | St | St | St | St |
|  | 21 | 27 | 15 | 6 | 21 | 15 | 6 |
|  | BMA | BMA | CHMA | MMA | BMA | CHMA | MMA |
|  | 28 | 56.7 | 15 | 4.6 | 28 | 15 | 4.6 |
| $\frac{\text{component (b) + (c) in core}}{\text{Total component (b) + (c)}}$ (%) | 30 | 10 | 50 | 80 | 30 | 50 | 80 |
| Non-volatile matter (%) 3) | 21.3 | 21.0 | 20.8 | 20.7 | 20.9 | 20.5 | 20.6 |
| Viscosity (cps) 4) | 62 | 37 | 58 | 61 | 63 | 59 | 60 |
| Average particle dia. (nm) 5) | 49 | 60 | 42 | 39 | 47 | 41 | 40 |
| Hexane tolerance 6) | 14 | 29 | 9 | 5 | 15 | 11 | 5 |
| Degree of swelling in acetone 7) | 2.2 | 6.8 | 2.1 | 2.1 | 2.3 | 2.2 | 2.1 |

Notes in Tables 1 and 2 above
1) Surfactant:
(a) Rapisol B90 (trade name of sodium di-2-ethylhexyl sulphosuccinate manufactured by Nippon Oil & Fats Co., Ltd.; active ingredient, 90%),
(b) Sintrex L-100 (trade name of sodium laurylsulphate manufactured by Nippon Oil & Fats Co., Ltd.; active ingredient, 100%),
(c) Sintrex EHR (trade name of sodium 2-ethylhexyl sulphate manufactured by Nippon Oil & Fats Co., Ltd.; active ingredient, 100%),
(d) Aerosol MA-80 (trade name of sodium dihexyl sulphosuccinate manufactured by American Cyanamid; active ingredient, 80%),
(e) Aerosol AY-65 (trade name of sodium diamyl sulphosuccinate manufactured by American Cyanamid; active ingredient, 65%), and
(f) Aerosol A-268 (trade name of di-sodium isodecyl sulphosuccinate manufactured by American Cyanamid; active ingredient, 50%).
2) α,β-ethylenically unsaturated monomer:
Component (a):
HEMA: 2-hydroxyethyl methacrylate,
HPMA: 2-hydroxypropyl methacrylate,
FM1, FM4 and FM10: Placcel FM1, Placcel FM4 and Placcel FM10 (trade names of monomers of 1 mole, 4 mol and 10 mole ε-caprolactone adduct, respectively, of 1 mole 2-hydroxyethyl methacrylate, manufactured by Daicel Chemical Industries, Ltd.),
Blemmer PP1000, Blemmer PE90 and Blemmer 70PEP350B: trade names of α,β-ethylenically unsaturated monomers (manufactured by Nippon Oil & Fats Co., Ltd.) shown by the following formula:

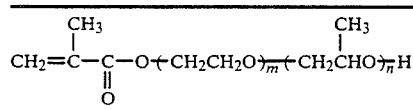

Blemmer PP1000: m = 0, n = 6,
Blemmer PE90: m = 2, n = 0,
Blemmer 70PEP350B: m = 7, n = 3,
Blemmer GLM: trade name of glycerol methacrylate manufactured by Nippon Oil & Fats Co., Ltd.
GMA/glycolic acid: a glycolic acid adduct of glycidyl methacrylate,
GMA/(lactic acid)$_8$: adduct of glycidyl methacrylate with 8 mole condensate of lactic acid, and
GMA/(12HSA)$_3$: adduct of glycidyl methacrylate with 3 mole condensate of 12-hydroxystearic acid.
Component (b):
EGDM: ethylene glycol dimethacrylate,
DEGDM: diethylene glycol dimethacrylate,
DVB: divinyl benzene (purity, 55%: containing 45% of ethyl vinyl benzene), and
TMPT: trimethylol propane triacrylate.
Component (c):
St: styrene,
BMA: n-butyl methacrylate,
EHMA: 2-ethylhexyl methacrylate,
i-BMA: isobutyl methacrylate,
MMA: methyl methacrylate, and
CHMA: cyclohexyl methacrylate.
3) In accordance with JIS K 5400 8.2, Non-volatile matter.
4) Measured by Brookfield viscometer with 60 rpm at 20° C.
5) Measured by "AUTOSIZER" (trade name) manufactured by Malvern.
6) Hexane tolerance: determined by the method of analysis described in Manufacturing Example A1, item (i).
7) Degree of swelling in acetone: determined by the method of analysis described in Manufacturing Example A1, item (ii).

3-A. MANUFACTURE OF POLYMER AQUEOUS DISPERSION (SOAP-FREE EMULSION POLYMERIZATION)

Manufacturing Example A23

| | |
|---|---|
| Deionized water | 280.0 parts |
| Polymerization initiator aqueous solution 1 | |
| Deionized water | 60.0 parts |
| Sodium persulphate | 2.0 parts |
| Particle-forming α,β-ethylenically unsaturated monomer mixture | |
| 2-Hydroxyethyl methacrylate | 9.2 parts |
| Diethylene glycol dimethacrylate | 20.0 parts |
| Styrene | 15.0 parts |
| Isobutyl methacrylate | 55.8 parts |
| Polymerization initiator aqueous solution 2 | |
| Deionized water | 60.0 parts |
| Sodium persulphate | 2.0 parts |

Into the same flask as used in Manufacturing Example A1, deionized water was introduced and after raising the temperature to 80° C., polymerization initiator aqueous solution 1 was added. Then, as the temperature of the mixture in the flask was kept at 80°±2° C., the particle-forming α,β-ethylenically unsaturated monomer mixture was added dropwise taking 3 hours. From 1 hour after the commencement of the addition and parallel with the addition of this monomer mixture, the polymerization initiator aqueous solution 2 was also added dropwise taking 2 hours. After completion of the addition of the particle-forming α,β-ethylenically unsaturated monomers and polymerization initiator aqueous solution 2, soap-free emulsion polymerization was further conducted at 80° C. for 2 hours to provide polymer aqueous dispersion A23. With respect to the obtained polymer aqueous dispersion, determined values of non-volatile matter, viscosities measured with Brookfield type viscometer at 20° C. and 60 rpm, and average particle diameters measured with "AUTOSIZER" manufactured by Malvern, are shown in Table 3.

TABLE 3

| | A23 | A24 | A25 | Unit: part A26 |
|---|---|---|---|---|
| Deionized water | 400 | 400 | 400 | 400 |
| Water-soluble polymerization initiator | Na$_2$S$_2$O$_8$ | K$_2$S$_2$O$_8$ | K$_2$S$_2$O$_8$ | (NH$_4$)$_2$S$_2$O$_8$ |
| | 4 | 4 | 4 | 4 |
| α,β-ethylenically unsaturated monomer | | | | |
| Component (a) | HEMA | HEMA | FM-1 | HEMA |
| | 9.2 | 2.5 | 7 | 5 |
| | | | | Blemmer |
| | | | | 20 |
| Active hydroxyl type monomer (mol. %) | 0 | 0 | 100 | 56 |
| Component (b) | DEGDM | DEGDM | DVB | DVB |
| | 20 | 20 | 18 | 8 |
| Component (c) | St | St | St | St |
| | 15 | 15 | 20 | 25 |
| | i-BMA | MMA | BMA | CHMA |
| | 55.8 | 62.5 | 55 | 42 |
| Non-volatile matter (%) | 20.2 | 20.3 | 20.6 | 20.8 |
| Viscosity (cps) | 40 | 53 | 52 | 61 |
| Average particle dia. (nm) | 265 | 282 | 343 | 369 |

TABLE 3-continued

|  | A23 | A24 | A25 | Unit: part<br>A26 |
|---|---|---|---|---|
| Hexane tolerance | 20 | 35 | 27 | 12 |
| Degree of swelling in acetone | 2.8 | 2.8 | 3.2 | 5.7 |

Manufacturing Examples A24, A25 and A26

Using the same apparatuses as those used in Manufacturing Example A1, and following the procedure in Manufacturing Example A23, based on the formulations A24, A25 and A26 in Table 3, polymer aqueous dispersions having characteristics shown in Table 3, respectively, were obtained.

Further, these dispersions were analyzed and measured for hexane tolerance and degree of swelling in acetone by exactly the same method as described in Manufacturing Example A1, (i) and (ii). The obtained measured values are shown in Table 3, respectively.

4-A. MANUFACTURE OF POLYMER AQUEOUS DISPERSION (SOAP-FREE CORE-SHELL TYPE EMULSION POLYMERIZATION)

Manufacturing Example A27

| Deionized water | 280.0 parts |
|---|---|
| Polymerization initiator aqueous solution 1 | |
| Deionized water | 60.0 parts |
| Potassium persulphate | 2.0 parts |
| Core-forming α,β-ethylenically unsaturated monomer mixture | |
| Ethylene glycol dimethacrylate | 7.5 parts |
| Styrene | 7.5 parts |
| Cyclohexyl methacrylate | 30.0 parts |
| Shell-forming α,β-ethylenically unsaturated monomer mixture | |
| 2-hydroxypropyl methacrylate | 10.0 parts |
| Ethylene glycol dimethacrylate | 7.5 parts |
| Styrene | 7.5 parts |
| Cyclohexyl methacrylate | 30.0 parts |
| Polymerization initiator aqueous solution 2 | |
| Deionized water | 60.0 parts |
| Potassium persulphate | 2.0 parts |

Into the same flask as used in Manufacturing Example A1, deionized water was introduced and after raising the temperature to 80° C., polymerization initiator aqueous solution 1 was added. Then, as the temperature of the mixture in the flask was kept at 80°±2° C., the core-forming α,β-ethylenically unsaturated monomer mixture was added dropwise taking 81 minutes and subsequently the shell-forming α,β-ethylenically unsaturated monomer mixture was added dropwise taking 99 minutes. From 1 hour after the commencement of the addition of the core-forming α,β-ethylenically unsaturated monomer mixture and parallel with the addition of core- and shell-forming α,β-ethylenically unsaturated monomer mixtures, the polymerization initiator aqueous solution 2 was also added dropwise taking 2 hours. After completion of the addition of the α,β-ethylenically unsaturated monomer mixture and polymerization initiator aqueous solution 2, soap-free emulsion polymerization was further conducted at 80° C. for 2 hours to provide polymer aqueous dispersion A27. Non-volatile matter, viscosities and average particle diameters of the obtained polymer aqueous dispersion are shown in Table 4.

Further, the dispersion A27 was analyzed and measured for hexane tolerance and degree of swelling in acetone by exactly the same method as described in Manufacturing Example A1, (i) and (ii). The obtained measured values are shown in Table 4.

Manufacturing Examples A28, A29 and A30

Using the same apparatuses as those used in Manufacturing Example A1, and following the procedure in manufacturing Example A27, based on the formulations A28~30 shown in Table 4, polymer aqueous dispersions having characteristics shown in Table 4, respectively, were obtained. However, the time required for adding the core- and shell-forming α,β-ethylenically unsaturated monomer mixtures was made to total 3 hours and the time for adding each mixture was made to correspond to the proportion of the monomers occupying the whole mixtures.

These dispersions were analyzed and measured for hexane tolerance and degree of swelling in acetone by exactly the same method as described in Manufacturing Example A1, (i) and (ii). The obtained values are shown in Table 4, respectively.

TABLE 4

|  | A27 | A28 | A29 | Unit: part<br>A30 |
|---|---|---|---|---|
| Deionized water | 400 | 400 | 400 | 400 |
| Water-soluble polymerization initiator | $K_2S_2O_8$ | $Na_2S_2O_8$ | $Na_2S_2O_8$ | $(NH_4)_2S_2O_8$ |
|  | 4 | 4 | 4 | 4 |
| Core-forming α,β-ethylenically unsaturated monomer | | | | |
| Component (b) | EGDM | DEGDM | TMPT | EGDM |
|  | 7.5 | 2.4 | 6 | 1 |
| Component (c) | St | St | St | St |
|  | 7.5 | 12 | 9 | 3 |
|  | CHMA | MMA | BMA | CHMA |
|  | 30 | 57.6 | 12 | 3.5 |
| α,β-ethylenically unsaturated monomer | | | | |
| Component (a) | HPMA | HPMA | HPMA | HPMA |
|  | 10 | 10 | 5 | 5 |
|  |  |  | FM10 | Blemmer PP1000 |
|  |  |  | 5 | 20 |
| Active hydroxyl type monomer (mol. %) | 0 | 0 | 10 | 56 |

TABLE 4-continued

|  | A27 | A28 | A29 | Unit: part A30 |
|---|---|---|---|---|
| Component (b) | EGDM | DEGDM | TMPT | EGDM |
|  | 7.5 | 0.6 | 14 | 9 |
| Component (c) | St | St | St | St |
|  | 7.5 | 3 | 21 | 27 |
|  | CHMA | MMA | BMA | CHMA |
|  | 30 | 14.4 | 28 | 31.5 |
| $\dfrac{\text{component (b) + (c) in core}}{\text{Total component (b) + (c)}}$ (%) | 50 | 80 | 30 | 10 |
| Non-volatile matter (%) | 20.4 | 20.2 | 20.3 | 20.5 |
| Viscosity (cps) | 48 | 71 | 55 | 48 |
| Average particle dia. (nm) | 273 | 381 | 317 | 297 |
| Hexane tolerance | 10 | 9 | 16 | 10 |
| Degree of swelling in acetone | 3.1 | 9.2 | 2.4 | 3.4 |

1-B. MANUFACTURE OF POLYMER NON-AQUEOUS DISPERSION (CONVERSION OF POLYMER AQUEOUS DISPERSIONS 1-A AND 2-A TO NON-AQUEOUS SYSTEM)

Manufacturing Example B1

Into a flask equipped with a stirrer, a reflux condenser, a dropping funnel and a thermometer, 1,000 parts of component A1, 400 parts of methylpentyl ketone and 45.3 parts of 3N-NaOH aqueous solution were introduced and the temperature was raised to 85° C. A hydrolysis reaction was carried out at 85°±2° C. for 3 hours. Then the temperature was lowered to 80° C. and after adding 45.3 parts of 3N-hydrochloric acid aqueous solution to neutralize, 143 parts of acrylic resin solution A (referred to hereinafter) were added as a particle dispersion stabilizing resin. After stirring for 10 minutes, 50 parts of triethylamine acetate 20% aqueous solution were added and immediately thereafter the stirring was stopped to leave the dispersion to stand still. Since an organic layer wherein polymer particles were dispersed was separated above from a lower water layer, the water layer was removed.

To the remaining organic layer wherein the polymer particles were dispersed, 400 parts of deionized water were added and the temperature was raised to 70° C. while stirring. When 70° C. was reached, 25 parts of triethylamine acetate 20% aqueous solution were added and immediately thereafter the stirring was stopped to leave the dispersion to stand still. Since the dispersion was again separated into two layers: an upper organic layer wherein polymer particles were dispersed and a lower water layer, the lower water layer was removed. In the remaining organic layer, 2.6% by weight of residual water were determined by Karl Fischer moisture meter.

Then the organic layer was cooled down to 50° C. After 114 parts of methyl orthoformate were added dropwise from the dropping funnel taking 30 minutes, the reaction was continued at 50° C. for 30 minutes, and then 200 parts of xylene were added. Newly fixing a Dean & Stark apparatus between the reflux condenser and the flask, connecting the upper part of the reflux condenser with an aspirator, the inside pressure of the flask was reduced while heating and stirring to distill off 504 parts of solvents at 80°±10° C. under 300±100 mmHg, and polymer non-aqueous dispersion B1 was obtained.

With respect to the obtained polymer non-aqueous dispersion, determined values of non-volatile matter, viscosities measured with Brookfield type viscometer at 20° C. and 60 rpm, average particle diameters measured with "AUTOSIZER" manufactured by Malvern, and water contents measured with Karl Fischer moisture meter, are shown in Table 5.

(i) Determination of Total Ion Content of Polymer Particle

Polymer non-aqueous dispersion B1 was diluted accurately 5 times with a mixed solvent of acetone/water=9/1 (weight ratio) by using a transfer pipette and a measuring flask, and dispersed therein. This diluted dispersion was passed at a rate of 50 parts per minute through a glass tube column having an inside diameter of 30 mm charged with Dia-ion SK-1B (trade name of a cation exchange resin manufactured by Mitsubishi Chemical Industries, Ltd.) which had previously been regenerated to acidic type (water in the column had previously been replaced by a mixed solvent of acetone/water=9/1 passed therethrough), to ion-exchange all of residual surfactants and polymerization initiator fragments in the dispersion. Then, acids in the dispersion were quantitatively analyzed with a potentiometric titration apparatus AT210 (trade name manufactured by Kyoto Electronics Manufacturing Co., Ltd.) using 0.1N—KOH ethanol solution as a standard solution.

Total ionic group concentration per solid matter in
the diluted dispersion $= 6.151 \times 10^{-5}$ mol/g Then, the ionic group concentration per solid matter of acrylic resin A was quantitatively analyzed with the potentiometric titration apparatus.

Ionic group concentration per solid matter of acrylic
resin $= 1.852 \times 10^{-4}$ mol/g By means of potentiometric titration analysis, sulphonate and sulphate ions are detectable separately from carboxylate ion, whereas in the above test samples none of sulphonate and sulphate ions was detected. Accordingly, from the result of the above analyses, the total ionic group concentration of polymer particles in polymer non-aqueous dispersion B1 which had only carboxylate ion was found as follows:

$$\frac{6.151 \times 10^{-5} - 0.3 \times 1.852 \times 10^{-4}}{0.7} =$$

$0.85 \times 10^{-5}$ mol/g particle

Namely, it was found that in polymer non-aqueous dispersion B1, there existed none of sulphonate and sulphate ions arising from Rapisol B90 and sodium persulphate, respectively, used in the emulsion polymerization, and only carboxylate ion produced by hydrolysis of a trace amount of the polymer particle was detected.

(ii) Determination of Na Ion

Polymer non-aqueous dispersion B1 was shaken with an equal quantity by weight of 0.2 N—HCl aqueous solution in a separatory funnel to extract Na ion entirely from the dispersion B1. This extract liquid was diluted accurately 10 times with deionized water by using a transfer pipette and a measuring flask and Na ion concentration was quantitatively determined by an atomic-absorption spectroscope, AA-670G V-6 (trade name, manufactured by Shimadzu Corporation). As a result, it was found that 28 ppm of Na ion existed in the dispersion B1 before extraction.

This Na ion concentration is equivalent to 0.5 mole % of the total amount of Rapisol B90 and sodium persulphate used in the emulsion polymerization and NaOH used in the hydrolysis step, so that a balance of 99.5 mole % were accounted to have been washed away out of the system.

Manufacturing Examples B2~B4, B8, B9, B16~B20

Using the same apparatuses as those used in Manufacturing Example B1, the procedure in manufacturing Example B1 was followed based on the formulations shown in Manufacturing Examples B2~B4, B8 and B9 in Table 5 and Manufacturing Examples B16~B19 in Table 6, and polymer non-aqueous dispersions B2~B4, B8 B9 B16~B20 having characteristics shown in Tables 5 and 6, respectively, were obtained.

Further, these dispersions were analyzed by exactly the same method as described in Manufacturing Example B1, (i) and (ii), and total ionic group concentrations in polymer particle and Na ion concentrations in dispersion shown in Tables 5 and 6, respectively, were determined. Additionally, no K ion was detected in dispersions B8, B9, B16, B17 and B18.

Manufacturing Examples B5~B7, B21~B24

Using a flask equipped with a stirrer, a reflux condenser and a thermometer, and following the procedure in Manufacturing Example B1, based on the formulations shown in Manufacturing Examples B5~B7 in Table 5 and Manufacturing Examples B21~B24 in Table 6, an organic layer wherein polymer particles were dispersed was washed with water, the water layer in separated two layers was removed and then newly fixing a Dean & Stark apparatus between the flask and the reflux condenser, a predetermined amount of water and solvent was distilled off at 80°±10° C. under a reduced pressure of 300±100 mmHg from the organic layer containing residual water, whereby polymer non-aqueous dispersions B5~B7 and B21~B24 having characteristics shown in Tables 5 and 6, respectively, were obtained.

Further, these dispersions were analyzed by exactly the same method as described in Manufacturing Example B1, (i) and (ii), and total ionic group concentrations in polymer particle and Na ion concentrations in dispersion shown in Tables 5 and 6, respectively, were determined. Additionally, no K ion was detected in dispersions B6 and B7.

Manufacturing Example B10

Using the same apparatuses as those used in Manufacturing Example B1, the procedure in Manufacturing Example B1 was followed based on the formulations shown in Manufacturing Example B10 in Table 5, an organic layer wherein polymer particles were dispersed was washed with water, and the water layer in separated two layers was removed. Then raising the temperature to 90° C., 45 parts of formamide were added dropwise from the dropping funnel taking 30 minutes, and further the reaction was continued at 90° C. for 3 hours. Then, using the same apparatuses as used in Manufacturing Example B1, 171 parts of solvent were distilled off under a reduced pressure, and cooling down to 50° C., produced ammonium formate was filtered off, whereby polymer non-aqueous dispersion B10 having characteristics shown in Table 5 was obtained.

Further, the obtained dispersion B10 was analyzed by exactly the same method as described in Manufacturing Example B1, (i) and (ii), and total ionic group concentrations in polymer particle and Na ion concentrations in dispersion shown in Table 5 were determined. Additionally, no K ion was detected in the dispersion.

Manufacturing Example 11

Using the same apparatuses as those used in Manufacturing Example B1, the procedure in Manufacturing Example B1 was followed based on the formulations shown in Manufacturing Example B11 in Table 5, an organic layer wherein polymer particles were dispersed was washed with water, and the water layer in separated two layers was removed. Then cooling down to 50° C., 223 parts of dicyclohexyl carbodiimide were added little by little taking 30 minutes, and further the reaction was continued at 50° C. for 1 hour. Then, 200 parts of xylene were added and using the same apparatuses as used in Manufacturing Example B1, 371 parts of solvent were distilled off under a reduced pressure. Thus produced dicyclohexyl urea was filtered off to obtain polymer non-aqueous dispersion B11 having characteristics shown in Table 5.

Further, the obtained dispersion B11 was analyzed by exactly the same method as described in Manufacturing Example B1, (i) and (ii), and total ionic group concentrations in polymer particle and Na ion concentrations in dispersion shown in Table 5 were determined. Additionally, no K ion was detected in the dispersion.

Manufacturing Examples B12~B14

Using a flask equipped with a stirrer, a reflux condenser and a thermometer, and following the procedure in Manufacturing Example B1, based on the formulations shown in Manufacturing Examples B12~B14 in Table 5, an organic layer wherein polymer particles were dispersed was washed with water, and the water layer in separated two layers was removed. Then the organic layer containing residual water was passed at a rate of 50 parts per minute through a glass tube column having an inside diameter of 30 mm charged with a predetermined amount of a polymer water absorbent or a molecular sieve. Thereafter, using the same apparatuses as used in Manufacturing Example B1, a predetermined amount of solvent was distilled off under a reduced pressure to obtain polymer non-aqueous dispersions B12~B14 having characteristics shown in Table 5.

Further, the obtained each dispersion was analyzed by exactly the same method as described in Manufacturing Example B1, (i) and (ii), and total ionic group concentration in polymer particle and Na ion concentration in dispersion shown in Table 5 were determined.

Manufacturing Example B15

Using a flask equipped with a stirrer, a reflux condenser and a thermometer, and following the procedure in Manufacturing Example B1, based on the formulation shown in Manufacturing Example B15 in Table 5, an organic layer wherein polymer particles were dispersed was washed with water and the water layer in separated two layers was removed. After adding 164 parts of $Na_2SO_4$ powder, stirring was conducted for 3 hours. Then using the same apparatuses as used in Manufacturing Example B1, a predetermined amount of solvent was distilled off under a reduced pressure. By filtering after cooling down to 50° C., polymer non-aqueous dispersion B15 having characteristics shown in Table 5 was obtained.

Further, the obtained dispersion B15 was analyzed by exactly the same method as described in Manufacturing Example B1, (i) and (ii), and total ionic group concentration in polymer particle and Na ion concentration in dispersion shown in Table 5 were determined.

TABLE 5

Unit: part

| | | | | | Manufacturing Example | | | | |
|---|---|---|---|---|---|---|---|---|---|
| | | | B1 | B2 | B3 | B4 | B5 | B6 | B7 | B8 |
| Hydrolysis step | Polymer aqueous dispersion | | A1<br>1000 | A2<br>1000 | A3<br>1000 | A4<br>1000 | A5<br>1000 | A6<br>1000 | A7<br>1000 | A8<br>1000 |
| | Organic solvent | Methylpentyl ketone | 400 | 400 | 400 | 400 | | | | |
| | | n-Butyl alcohol | | | | | 280 | 280 | 280 | 280 |
| | | 4-Methyl-2-pentyl alcohol | | | | | | | | |
| | | Methyl-isobutyl ketone | | | | | | | | |
| | | Xylene | | | | | | | | |
| | Basic compound catalyst | 3N—NaOH aq. solution (molar ratio) 1) | 45.3<br>(2) | 45.3<br>(2) | 45.3<br>(2) | 45.3<br>(2) | 45.3<br>(2) | 45.3<br>(2) | 45.3<br>(2) | 45.3<br>(2) |
| | Heating conditions | | 85° C.<br>3 Hrs.<br>45.3 | 85° C.<br>3 Hrs.<br>45.3 | 85° C.<br>3 Hrs.<br>45.3 | 85° C.<br>3 Hrs.<br>45.3 | 85° C.<br>3 Hrs.<br>45.3 | 85° C.<br>3 Hrs.<br>45.3 | 85° C.<br>3 Hrs.<br>45.3 | 85° C.<br>3 Hrs.<br>45.3 |
| | Acidic compound | 3N—HCl aq. solution | | | | | | | | |
| Neutralization stabilizing step | Dispersion stabilizing resin 2) | Acrylic resin A | 143 | 143 | 143 | 143 | 143 | 143 | 143 | 143 |
| | | Acrylic resin B | | | | | | | | |
| | | Particle/resin | 70/30 | 70/30 | 70/30 | 70/30 | 70/30 | 70/30 | 70/30 | 70/30 |
| Water separation step | Amine salt of organic acid 3) (20% aq. solution) | | Acetic acid/TEA<br>50 | Acetic acid/TEA<br>50 | Acetic acid/TEA<br>50 | Acetic acid/TEA<br>50 | Acetic acid/TEA<br>50 | Formic acid/pyridine<br>50 | Formic acid/pyridine<br>50 | Formic acid/pyridine<br>50 |
| | Deionized water | | 400 | 400 | 400 | 400 | 400 | 400 | 400 | 400 |
| Water washing step | Amine salt of organic acid 3) (20% aq. solution) | | Acetic acid/TEA<br>25 | Acetic acid/TEA<br>25 | Acetic acid/TEA<br>25 | Acetic acid/TEA<br>25 | Acetic acid/TEA<br>25 | Formic acid/pyridine<br>25 | Formic acid/pyridine<br>25 | Formic acid/pyridine<br>25 |
| | Residual water 4) | | 2.6 | 2.8 | 2.2 | 2.4 | 14.5 | 14.2 | 15.0 | 3.2 |
| Residual water removing step | Method 5) | | Methyl orthoformate<br>114 | Methyl orthoformate<br>123 | Methyl orthoformate<br>96 | Methyl orthoformate<br>105 | Vacuum distillation<br>300 ± 100 mmHg<br>80 ± 10° C. | Vacuum distillation<br>300 ± 100 mmHg<br>80 ± 10° C. | Vacuum distillation<br>300 ± 100 mmHg<br>80 ± 10° C. | Diketene<br>111 |
| Desolvation step | Amount of xylene added | | 200 | 200 | 200 | 200 | | | | 200 |
| | Amount of desolvation | | 504 | 515 | 483 | 494 | | | | 506 |
| Characteristics of polymer non-aq. dispersion | Non-volatile matter (%) 6) | | 50.2 | 50.4 | 51.0 | 50.8 | 51.1 | 50.8 | 50.7 | 50.5 |
| | Viscosity (cps) 7) | | 543 | 465 | 373 | 382 | 435 | 443 | 472 | 470 |
| | Average particle dia. (nm) 8) | | 83 | 72 | 61 | 42 | 45 | 41 | 43 | 38 |
| | Water content (%) 4) | | 0.1 | 0.1 | 0.1 | 0.1 | 0.4 | 0.4 | 0.4 | 0.1 |
| | Total ionic group concentration of polymer particles (mol/g particle) 9) | | $0.85 \times 10^{-5}$ | $0.73 \times 10^{-5}$ | $0.98 \times 10^{-5}$ | $0.82 \times 10^{-5}$ | $0.81 \times 10^{-5}$ | $0.74 \times 10^{-5}$ | $0.93 \times 10^{-5}$ | $0.94 \times 10^{-5}$ |
| | Na ion concentration (ppm) 10) | | 28 | 26 | 31 | 29 | 30 | 27 | 32 | 26 |

Unit: part

| | | | Manufacturing Example | | | | | | |
|---|---|---|---|---|---|---|---|---|---|
| | | | B9 | B10 | B11 | B12 | B13 | B14 | B15 |
| Hydrolysis step | Polymer aqueous dispersion | | A9<br>1000 | A10<br>1000 | A11<br>1000 | A12<br>1000 | A13<br>1000 | A14<br>1000 | A15<br>1000 |
| | Organic solvent | Methylpentyl ketone | | | | | | | |
| | | n-Butyl alcohol | 280 | 280 | 280 | | | | |
| | | 4-Methyl-2-pentyl alcohol | | | | | | | |

TABLE 5-continued

| | | | | | | | | |
|---|---|---|---|---|---|---|---|---|
| | Methyl-isobutyl ketone Xylene | 120 | 120 | 120 | 400 | 400 | 400 | 400 |
| Basic compound catalyst | 3N—NaOH aq. solution (molar ratio) 1) | 45.3 (2) | 45.3 (2) | 45.3 (2) | 34.0 (1.5) | 34.0 (1.5) | 56.7 (2.5) | 31.7 (2.5) |
| | Heating conditions | 85° C. 3 Hrs. | 85° C. 3 Hrs. | 85° C. 3 Hrs. | 85° C. 3 Hrs. | 85° C. 3 Hrs. | 85° C. 3 Hrs. | 85° C. 3 Hrs. |
| Acidic compound | 3N—HCl aq. solution | 45.3 | 45.3 | 45.3 | 34.0 | 34.0 | 56.7 | 31.7 |
| Neutralization step | Dispersion stabilizing resin 2) | Acrylic resin A Resimene 755 Particle/resin | 143 70/30 | 143 70/30 | 143 70/30 | 86 70/30 | 86 70/30 | 86 70/30 | 86 70/30 |
| Water separation step | Amine salt of organic acid 3) (20% aq. solution) | Formic acid/pyridine 50 | Formic acid/pyridine 50 | Formic acid/pyridine 50 | Acetic acid/TMA 50 | Formic acid/TMA 50 | Formic acid/TMA 50 | Formic acid/TMA 50 |
| Water-washing step | Deionized water Amine salt of organic acid 3) (20% aq. solution) | 400 Formic acid/pyridine 25 | 400 Formic acid/pyridine 25 | 400 Formic acid/pyridine 25 | 400 Formic acid/TMA 25 | 400 Formic acid/TMA 25 | 400 Formic acid/TMA 25 | 400 Formic acid/TMA 25 |
| Residual water removing step | Residual water 4) Method 5) | 2.7 Diketene 93 | 2.4 Formamide 45 | 2.6 Dicyclohexyl carbodiimide 223 | 2.5 Sumika Gel S50 10 | 2.9 Sumika Gel S50 10 | 2.1 Molecular sieve 4Al/8 20 | 2.8 $Na_2SO_4$ 164 |
| Desolvation step | Amount of xylene added Amount of desolvation Non-volatile matter (%) 6) Viscosity (cps) 7) | 200 484 50.2 458 | 200 371 50.2 454 | 200 371 50.2 454 | 114 50.1 444 | 114 50.2 425 | 114 50.0 430 | 114 49.8 413 |
| Characteristics of polymer non-aq. dispersion | Average particle dia. (nm) 8) Water content (%) 4) Total ionic group concentration of polymer particles (mol/g particle) 9) Na ion concentration (ppm) 10) | 55 0.1 $0.90 \times 10^{-5}$ 30 | 49 0.1 $0.88 \times 10^{-5}$ 25 | 53 0.1 $0.92 \times 10^{-5}$ 26 | 55 0.4 $0.57 \times 10^{-5}$ 24 | 45 0.3 $0.61 \times 10^{-5}$ 31 | 47 0.2 $1.23 \times 10^{-5}$ 33 | 42 0.3 $1.27 \times 10^{-5}$ 26 |

TABLE 6

Unit: part

| | Manufacturing Example | | | | | |
|---|---|---|---|---|---|---|
| | B16 | B17 | B18 | B19 | B20 | B21 |
| Hydrolysis step | | | | | | |
| Polymer aqueous dispersion | A16 | A17 | A16 | A18 | A19 | A20 |
| | 1000 | 1000 | 1000 | 1000 | 1000 | 1000 |
| Organic solvent | | | | | | |
| Methylpentyl ketone | 400 | 400 | 400 | 400 | 400 | |
| n-Butyl alcohol | | | | | | 120 |
| Xylene | | | | | | 280 |
| Basic compound catalyst | | | | | | |
| 3N—NaOH aq. solution | 45.3 | 45.3 | 45.3 | 45.3 | 45.3 | 45.3 |
| (molar ratio) 1) | (2) | (2) | (2) | (2) | (2) | (2) |
| Heating conditions | 85° C. | 85° C. | 85° C. | 85° C. | 85° C. | 85° C. |
| | 3 Hrs. | 3 Hrs. | 3 Hrs. | 3 Hrs. | 3 Hrs. | 3 Hrs. |
| Neutralization stabilizing step | | | | | | |
| Acidic compound | 45.3 | 45.3 | 45.3 | 45.3 | 45.3 | 45.3 |
| 3N—HCl aq. solution | | | | | | |
| Dispersion stabilizing resin 2) | | | | | | |
| Acrylic resin B | 143 | | | | | 143 |
| Alkyd resin C | | 143 | 143 | 143 | 143 | |
| Cymel 1171 | | | | | | |
| Particle/resin | 70/30 | 70/30 | 70/30 | 70/30 | 70/30 | 70/30 |
| Water separation step | | | | | | |
| Amine salt of organic acid 3) | Acetic | Acetic | Acetic | Acetic | Acetic acid/ | Formic acid/ |
| (20% aq. solution) | acid/TEA | acid/TEA | acid/TEA | acid/TEA | TEA | pyridine |
| | 50 | 50 | 50 | 50 | 50 | 50 |
| Water-washing step | | | | | | |
| Deionized water | 400 | 400 | 400 | 400 | 400 | 400 |
| Amine salt of organic acid 3) | Acetic | Acetic | Acetic | Acetic | Acetic acid/ | Formic acid/ |
| (20% aq. solution) | acid/TEA | acid/TEA | acid/TEA | acid/TEA | TEA | pyridine |
| | 25 | 25 | 25 | 25 | 25 | 25 |
| Residual water (%) 4) | 2.7 | 2.2 | 2.7 | 2.3 | 2.4 | 3.2 |
| Residual water removing step | | | | | | |
| Method 5) | Methyl orthoformate | Methyl orthoformate | Methyl orthoformate | Methyl orthoformate | Methyl orthoformate | Vacuum distillation |
| | 119 | 96 | 119 | 101 | 105 | 300 ± 100 mmHg |
| | | | | | | 80 ± 10° C. |
| Desolvation step | | | | | | |
| Amount of xylene added | 200 | 200 | 200 | 200 | 200 | |
| Amount of desolvation | 510 | 483 | 510 | 489 | 494 | 195 11) |
| Characteristics of polymer non-aqueous dispersion | | | | | | |
| Non-volatile matter (%) 6) | 50.4 | 50.1 | 50.3 | 50.7 | 50.3 | 51.3 |
| Viscosity (cps) 7) | 463 | 495 | 460 | 451 | 464 | 472 |
| Average particle dia. (nm) 8) | 51 | 78 | 50 | 44 | 40 | 49 |
| Water content (%) 4) | 0.1 | 0.1 | 0.1 | 0.1 | 0.1 | 0.4 |
| Total ionic group concentration of polymer particles (mol./g particle) 9) | $0.92 \times 10^{-5}$ | $0.85 \times 10^{-5}$ | $0.90 \times 10^{-5}$ | $0.87 \times 10^{-5}$ | $1.01 \times 10^{-5}$ | $0.88 \times 10^{-5}$ |
| Na ion concentration (ppm) 10) | 32 | 31 | 30 | 28 | 27 | 28 |

| | Manufacturing Example | | |
|---|---|---|---|
| | B22 | B23 | B24 |
| Hydrolysis step | | | |
| Polymer aqueous dispersion | A20 | A21 | A22 |
| | 1000 | 1000 | 1000 |
| Organic solvent | | | |
| Methylpentyl ketone | | | |
| n-Butyl alcohol | 120 | 120 | 120 |
| Xylene | 280 | 280 | 280 |
| Basic compound catalyst | | | |
| 3N—NaOH aq. solution | 45.3 | 45.3 | 45.3 |
| (molar ratio) 1) | (2) | (2) | (2) |
| Heating conditions | 85° C. | 85° C. | 85° C. |
| | 3 Hrs. | 3 Hrs. | 3 Hrs. |
| Neutralization stabilizing step | | | |
| Acidic compound | 45.3 | 45.3 | 45.3 |
| 3N—HCl aq. solution | | | |
| Dispersion stabilizing resin 2) | | | |
| Acrylic resin B | | | |
| Alkyd resin C | 143 | 143 | |
| Cymel 1171 | | | 90 |
| Particle/resin | 70/30 | 70/30 | 70/30 |
| Water separation step | | | |
| Amine salt of organic acid 3) | Formic acid/ | Formic acid/ | Formic acid/ |
| (20% aq. solution) | pyridine | pyridine | pyridine |

TABLE 6-continued

Unit: part

| | | | | |
|---|---|---|---|---|
| Water-washing step | | 50 | 50 | 50 |
| Deionized water | | 400 | 400 | 400 |
| Amine salt of organic acid 3) (20% aq. solution) | | Formic acid/ pyridine 25 | Formic acid/ pyridine 25 | Formic acid/ pyridine 25 |
| Residual water (%) 4) | | 3.2 | 2.8 | 2.9 |
| Residual water removing step | | | | |
| Method 5) | | Vacuum distillation 300 ± 100 mmHg 80 ± 10° C. | Vacuum distillation 300 ± 100 mmHg 80 ± 10° C. | Vacuum distillation 300 ± 100 mmHg 80 ± 10° C. |
| Desolvation step | | | | |
| Amount of xylene added Amount of desolvation | | 195 11) | 192 11) | 138 11) |
| Characteristics of polymer non-aqueous dispersion | | | | |
| Non-volatile matter (%) 6) | | 51.0 | 51.2 | 50.8 |
| Viscosity (cps) 7) | | 468 | 453 | 460 |
| Average particle dia. (nm) 8) | | 47 | 43 | 45 |
| Water content (%) 4) | | 0.4 | 0.3 | 0.4 |
| Total ionic group concentration of polymer particles (mol./g particle) 9) | | $0.89 \times 10^{-5}$ | $0.93 \times 10^{-5}$ | $0.91 \times 10^{-5}$ |
| Na ion concentration (ppm) 10) | | 29 | 26 | 29 |

Notes in Tables 5 and 6 above
1) Molar ratio of NaOH aqueous solution: A molar ratio of NaOH to the sum total of a total amount of ester groups in ester group containing surfactants contained in polymer aqueous dispersion and a double amount of water-soluble polymerization initiator.
2) Dispersion stabilizing resin:
Acrylic resin A: A reactor equipped with a stirrer, a thermometer, a reflux condenser, a nitrogen gas feed pipe and a dropping funnel, was charged with 42 parts of xylene and heated while stirring, as feeding nitrogen gas. When the temperature reached 140° C., the mixture of the monomer components and the polymerization initiator shown below was dropped at a constant rate from the dropping funnel taken 2 hours, as keeping a constant temperature of 140° C.

| | |
|---|---|
| n-Butyl methacrylate | 36.4 parts |
| 2-Ethylhexyl methacrylate | 11.7 " |
| 2-Hydroxyethyl methacrylate | 11.1 " |
| Acrylic acid | 0.8 " |
| t-Butyl peroxybenzoate | 3.0 " |
| Total | 63.0 parts |

After the dropping was completed, the contents were kept at 140° C. for 2 hours before cooled down and taken out. The non-volatile matter was 60% and the number average molecular weight was 6,500.
Acrylic resin B: Using the same apparatuses as those used in the preparation of Acrylic resin A, the same procedure was followed based on the formulations shown below, and Acrylic resin B having 60% non-volatile matter and a number average molecular weight of 7,000 was obtained.

| | |
|---|---|
| Xylene | 42 parts |
| Styrene | 16.8 " |
| 2-Ethylhexyl methacrylate | 28.5 " |
| 2-Hydroxyethyl methacrylate | 13.9 " |
| Acrylic acid | 0.8 " |
| t-Butyl peroxybenzoate | 3.0 " |
| Total | 105 parts |

Alkyd resin C: A flask equipped with a stirrer, a thermometer, a nitrogen gas feed pipe and a Dean & Stark apparatus provided with a reflux condenser, was charged with the monomers shown below and heated to raise the temperature up to 200° C. while stirring, as feeding nitrogen gas. When the acid value reached 10 at a constant temperature of 200° C., the reaction was stopped and the reactants were cooled down. When 100° C. was reached, 36 parts of xylene were added to dilute the contents which were further cooled down and taken out. The non-volatile matter was 60%, the number average molecular weight was 1,500, the acid value of resin was 10 and the hydroxyl value was 150.

| | |
|---|---|
| Soybean oil fatty acid | 12 parts |
| Isophthalic acid | 18 " |
| Trimethylol propane | 16.6 " |
| Adipic acid | 7.2 " |
| Neopentyl glycol | 6.2 " |
| Total | 60 parts |

Resimene 755: Trade name of a methyl/butyl mix-etherified melamine resin having 100% non-volatile matter, manufactured by Monsanto.
Cymel 1171: Trade name of a glycoluryl resin having 95% non-volatile matter, manufactured by American Cyanamid.
3) Amine salt of organic acid: An amine salt of organic acid 20% aqueous solution was prepared by dissolving an organic acid into deionized water and adding an amine thereto while stirring, with the formulations shown below.

| | Acetic acid/TEA | Formic acid/ pyridine | Formic acid/TMA |
|---|---|---|---|
| Deionized water | 80 | 80 | 80 |
| organic acid | acetic acid 11.8 | Formic acid 7.4 | Formic acid 10 |
| Amine | TEA 8.2 | Pyridine 12.6 | TMA 10 |
| | 100 | 100 | 100 |

TEA: Triethyl amine
TMA: Trimethyl amine
4) Measured with KF-05 type moisture meter manufactured by Mitsubishi Chemical Industries, Ltd.
5) Sumika Gel S50: Trade name of a polymer water absorbent manufactured by Sumitomo Chemical Co., Ltd.

TABLE 6-continued

Unit: part

6), 7) and 8) As aforecited.
9) Total ionic group concentration of polymer particle: Measured in accordance with the analysis method described in Manufacturing Example B1, (i).
10) Na ion concentration: Total amount of Na ion in polymer non-aqueous dispersion, measured in accordance with the analysis method described in Manufacturing Example B1, (ii).
11) Water contents in the removed solvents in Manufacturing Examples B5~B7 and B21~B24 are shown below, respectively.

| | | |
|---|---|---|
| B5 | 108 | parts |
| B6 | 106 | " |
| B7 | 111 | " |
| B21 | 24 | " |
| B22 | 24 | " |
| B23 | 21 | " |
| B24 | 20 | " |

2B. MANUFACTURE OF POLYMER NON-AQUEOUS DISPERSION (CONVERSION OF POLYMER AQUEOUS DISPERSIONS 3-A AND 4-A TO NON-AQUEOUS SYSTEM)

Manufacturing Examples B25, B26 and B27

Using the same apparatuses as those used in Manufacturing Example B1, the procedure in Manufacturing Example B1 was followed based on the formulations shown in Manufacturing Examples B25, B26 and B27 in Table 7, and polymer non-aqueous dispersions B25, B26 and B27 having characteristics shown in Table 7, respectively, were obtained.

Further, these dispersions were analyzed by exactly the same method as described in Manufacturing Example B1, (i) and (ii), and total ionic group concentrations in polymer particle and Na ion concentrations in dispersion shown in Table 7, respectively, were determined. Additionally, no K ion was detected in dispersions B26 and B27.

Manufacturing Example B28

Using a flask equipped with a stirrer, a reflux condenser and a thermometer and following the procedure in Manufacturing Example B1, based on the formulation shown in Manufacturing Example B28 in Table 7, an organic layer wherein polymer particles were dispersed was washed with water, and the water layer in separated two layers was removed. Then newly fixing a Dean & Stark apparatus between the flask and the reflux condenser, a predetermined amount of water and solvent was distilled off at 80°±10° C. under a reduced pressure of 300±100 mmHg from the organic layer containing residual water, whereby polymer non-aqueous dispersion B28 having characteristics shown in Table 7 was obtained.

Further, the dispersion was analyzed by exactly the same method as described in Manufacturing Example B1, (i) and (ii), and total ionic group concentration in polymer particle and Na ion concentration in dispersion shown in Table 7 were determined.

Manufacturing Example B29

Using the same apparatuses as those used in Manufacturing Example B1, the procedure in Manufacturing Example B1 was followed based on the formulation shown in Manufacturing Example B29 in Table 7. An organic layer wherein polymer particles were dispersed was washed with water, and the water layer in separated two layers was removed. Then raising the temperature to 90° C., 47 parts of formamide were added dropwise from the dropping funnel taking 30 minutes, and further the reaction was continued at 90° C. for 3 hours. Then, using the same apparatuses as used in manufacturing Example B1, 171 parts of solvent were distilled off under a reduced pressure. After cooling down to 50° C., produced ammonium formate was filtered off to obtain polymer non-aqueous dispersion B29 having characteristics shown in Table 7.

Further, the obtained dispersion was analyzed by exactly the same method as described in Manufacturing Example B1, (i) and (ii), and total ionic group concentration in polymer particle and Na ion concentration in dispersion shown in Table 7 were determined. Additionally, no K ion was detected.

Manufacturing Examples B30 and B31

Using a flask equipped with a stirrer, a reflux condenser and a thermometer and following the procedure in Manufacturing Example B1, based on the formulations shown in Manufacturing Examples B30 and B31 in Table 7, an organic layer wherein polymer particles were dispersed was washed with water, and the water layer in separated two layers was removed. Then the organic layer containing residual water was passed at a rate of 50 parts per minute through a glass tube column having an inside diameter of 30 mm charged with a predetermined amount of a polymer water adsorbent or a molecular sieve. Thereafter, using the same apparatuses as used in Manufacturing Example B1, a predetermined amount of solvent was distilled off under a reduced pressure to obtain polymer non-aqueous dispersions B30 and B31 having characteristics shown in Table 7.

Further, the obtained each dispersion was analyzed by exactly the same method as described in Manufacturing Example B1, (i) and (ii), and total ionic group concentration in polymer particle and Na ion concentration in dispersion shown in Table 7 were determined.

Manufacturing Example B32

Using a flask equipped with a stirrer, a reflux condenser and a thermometer, and following the procedure in Manufacturing Example B1, based on the formulation shown in Manufacturing Example B32 in Table 7, an organic layer wherein polymer particles were dispersed was washed with water, and the water layer in separated two layers was removed. Then a predetermined amount of $Na_2SO_4$ powder was added and stirring was conducted for 3 hours. Thereafter, using the same apparatuses as used in Manufacturing Example B1, a predetermined amount of solvent was distilled off under a reduced pressure. By filtering after cooling down to 50° C., polymer non-aqueous dispersion B32 having characteristics shown in Table 7 was obtained.

Further, the obtained dispersion B32 was analyzed by exactly the same method as described in Manufacturing Example B1, (i) and (ii), and total ionic group concentrations in polymer particle and Na ion concentrations in dispersion shown in Table 7 were determined.

TABLE 7

|  | Unit: part Manufacturing Example | | | |
|---|---|---|---|---|
|  | B25 | B26 | B27 | B28 |
| *Hydrolysis step* | | | | |
| Polymer aqueous dispersion | A23 | A24 | A25 | A26 |
|  | 1000 | 1000 | 1000 | 1000 |
| Organic solvent | | | | |
| n-Butyl alcohol |  |  |  | 280 |
| 4-Methyl-2-pentyl alcohol | 280 | 280 | 280 |  |
| Methylpentyl ketone |  |  |  |  |
| Xylene | 120 | 120 | 120 | 120 |
| Basic compound catalyst | | | | |
| 3N—NaOH aq. solution | 11.2 | 9.9 | 9.9 | 11.7 |
| (molar ratio) | (2) | (2) | (2) | (1.5) |
| Heating conditions | 85° C. | 85° C. | 85° C. | 85° C. |
|  | 3 Hrs. | 3 Hrs. | 3 Hrs. | 3 Hrs. |
| *Neutralization stabilizing step* | | | | |
| Acidic compound | 11.2 | 9.9 | 9.9 | 11.7 |
| 3N—HCl aq. solution | | | | |
| Dispersion stabilizing resin | | | | |
| Acrylic resin A | 143 | 143 |  |  |
| Acrylic resin B |  |  | 143 | 143 |
| Alkyd resin C | | | | |
| Particle/resin | 70/30 | 70/30 | 70/30 | 70/30 |
| *Water separation step* | | | | |
| Amine salt of organic acid | Acetic | Formic acid/ | Formic acid/ | Formic |
| (20% aq. solution) | acid/TEA | pyridine | pyridine | acid/TMA |
|  | 50 | 50 | 50 | 50 |
| *Water-washing step* | | | | |
| Deionized water | 400 | 400 | 400 | 400 |
| Amine salt of organic acid | Acetic | Formic acid/ | Formic acid/ | Formic |
| (20% aq. solution) | acid/TEA | pyridine | pyridine | acid/TMA |
|  | 25 | 25 | 25 | 25 |
| Residual water (%) | 2.8 | 2.4 | 2.7 | 14.5 |
| *Residual water removing step* | | | | |
| Method | Methyl | Methyl | Diketene | Vacuum |
|  | orthoformate | orthoformate | 93 | distillation |
|  | 123 | 105 |  | 300 ± 100 mmHg |
|  |  |  |  | 80 ± 10° C. |
| *Desolvation step* | | | | |
| Amount of xylene added | 200 | 200 | 200 |  |
| Amount of desolvation | 515 | 494 | 484 | 279 |
| *Characteristics of polymer non-aqueous dispersion* | | | | |
| Non-volatile matter (%) | 50.1 | 50.3 | 50.5 | 50.1 |
| Viscosity (cps) | 437 | 188 | 214 | 482 |
| Average particle dia. (nm) | 293 | 304 | 362 | 463 |
| Water content (%) | 0.1 | 0.1 | 0.1 | 0.4 |
| Total ionic group concentration of polymer particles (mol./g particle) | $0.81 \times 10^{-5}$ | $0.94 \times 10^{-5}$ | $0.72 \times 10^{-5}$ | $0.90 \times 10^{-5}$ |
| Na ion concentration (ppm) | 27 | 28 | 30 | 26 |

|  | Unit: part Manufacturing Example | | | |
|---|---|---|---|---|
|  | B29 | B30 | B31 | B32 |
| *Hydrolysis step* | | | | |
| Polymer aqueous dispersion | A27 | A28 | A29 | A30 |
|  | 1000 | 1000 | 1000 | 1000 |
| Organic solvent | | | | |
| N-Butyl alcohol |  |  |  | 120 |
| 4-Methyl-2-pentyl alcohol | | | | |
| Methylpentyl ketone | 400 | 400 | 400 |  |
| Xylene |  |  |  | 280 |
| Basic compound catalyst | | | | |
| 3N—NaOH aq. solution | 9.9 | 11.2 | 11.2 | 11.7 |
| (molar ratio) | (2.5) | (2) | (2) | (2) |
| Heating conditions | 85° C. | 85° C. | 85° C. | 85° C. |
|  | 3 Hrs. | 3 Hrs. | 3 Hrs. | 3 Hrs. |
| *Neutralization stabilizing step* | | | | |
| Acidic compound | 9.9 | 11.2 | 11.2 | 11.7 |
| 3N—HCl aq. solution | | | | |
| Dispersion stabilizing resin | | | | |
| Acrylic resin A | 143 | 143 |  |  |
| Alkyd resin B | | | | |

TABLE 7-continued

| | | | | |
|---|---|---|---|---|
| Alkyd resin C | | | 143 | 143 |
| Particle/resin | 70/30 | 70/30 | 70/30 | 70/30 |
| Water separation step | | | | |
| Amine salt of organic acid (20% aq. solution) | Acetic acid/TEA 50 | Acetic acid/TEA 50 | Formic acid/TMA 50 | Formic acid/ pyridine 50 |
| Water-washing step | | | | |
| Deionized water | 400 | 400 | 400 | 400 |
| Amine salt of organic acid (20% aq. solution) | Acetic acid/TEA 25 | Acetic acid/TEA 25 | Formic acid/TMA 25 | Formic acid/ pyridine 25 |
| Residual water (%) | 2.5 | 2.7 | 2.8 | 2.9 |
| Residual water removing step | | | | |
| Method | Formamide 47 | Sumika Gel S50 10 | Molecular sieve 4A1/8 20 | $Na_2SO_4$ 164 |
| Desolvation step | | | | |
| Amount of xylene added | | | | |
| Amount of desolvation | 171 | 171 | 171 | 171 |
| Characteristics of polymer non-aqueous dispersion | | | | |
| Non-volatile matter (%) | 50.2 | 50.4 | 50.0 | 50.1 |
| Viscosity (cps) | 357 | 523 | 395 | 466 |
| Average particle dia. (nm) | 295 | 684 | 342 | 320 |
| Water content (%) | 0.2 | 0.2 | 0.3 | 0.2 |
| Total ionic group concentration of polymer particles (mol./g particle) | $1.03 \times 10^{-5}$ | $0.87 \times 10^{-5}$ | $0.79 \times 10^{-5}$ | $0.84 \times 10^{-5}$ |
| Na ion concentration (ppm) | 29 | 31 | 28 | 27 |

Manufacturing Example A31

Manufacture of Polymer Aqueous Dispersion
(Comparative Manufacturing Example)

| | |
|---|---|
| Aerosol 18 (trade name of di-sodium N-octadecyl-sulpho-succinate, manufactured by American Cyanamid) | 3.00 parts |
| Aerosol AY65 (trade name of sodium diamyl-sulpho-succinate, manufactured by American Cyanamid) | 1.50 " |
| Sodium bicarbonate | 0.25 " |
| Deionized water (No. 1) | 39.75 " |
| Ammonium persulphate | 0.25 " |
| Deionized water (No. 2) | 7.25 " |
| Styrene | 11.975 " |
| Butyl methacrylate | 11.050 " |
| 2-Ethylhexyl acrylate | 9.125 " |
| 2-Hydroxypropyl methacrylate | 11.050 " |
| Acrylic acid | 0.95 " |
| Trimethylolpropane triacrylate | 3.85 " |

A 5 l five-necked flask equipped with a reflux condenser, a thermometer and a stirrer was charged with Aerosol 18, Aerosol AY65, sodium bicarbonate, and the deionized water (No. 1). Ammonium persulphate and the deionized water (No. 2) were premixed and put into a small adding funnel. Styrene, butyl methacrylate, 2-ethylhexyl acrylate, 2-hydroxypropyl methacrylate, acrylic acid and trimethylol. propane triacrylate were premixed and put into another adding funnel. An anionic surfactant and water were mixed and heated up to 87°±2° C. when 10% of the ammonium persulphate solution was added. The α,β-ethylenically unsaturated monomers were continuously introduced into the flask taking 2 hours and 30 minutes. At the same time, the rest of the ammonium persulphate solution was continuously added taking 3 hours. After the addition of the ammonium persulphate solution, polymer aqueous dispersion A31 was cooled down to room temperature and taken out. This dispersion had 48.2% non-volatile matter and an average particle diameter of 153 nm.

Additionally, this dispersion A31 was diluted with deionized water to reduce the non-volatile matter to 20% and analyzed by exactly the same method as described in Manufacturing Example A1, (i) and (ii). Hexane tolerance and degree of swelling in acetone were determined as follows:

$HT = 7$ $S = 3.5$

Manufacturing Example B33

Manufacture of Polymer Non-Aqueous Dispersion
(Comparative Manufacturing Example)

| | |
|---|---|
| n-Butyl alcohol | 17.60 parts |
| Ethylene glycol monoethylether acetate | 17.60 parts |
| Polymer aqueous dispersion A31 | 11.37 parts |
| t-Butyl-2-ethyl hexanoate (50% solution in mineral spirit) | 0.71 parts |
| (Premix I) | |
| Styrene | 13.34 parts |
| Butyl methacrylate | 11.50 parts |
| n-Dodecyl mercaptan | 1.70 parts |
| (Premix II) | |
| 2-Ethylhexyl acrylate | 10.76 parts |
| 2-Hydroxyethyl acrylate | 9.25 parts |
| Acrylic acid | 0.97 parts |
| t-Butyl-2-ethyl hexanoate (50% solution in mineral spirit) | 4.54 parts |
| t-Butyl-2-ethyl hexanoate (50% solution in mineral spirit) | 0.23 parts |
| Ethylene glycol monoethylether acetate | 0.43 parts |

A four-necked-flask equipped with a reflux condenser, a Dean & Stark apparatus, a thermometer and a stirrer was charged with n-butyl alcohol, ethylene glycol monoethylether acetate, polymer aqueous dispersion and t-butyl-2-ethyl hexanoate. Styrene, butyl methacrylate and n-dodecyl mercaptan were premixed and put into an adding funnel (Premix I).

2-Ethylhexyl acrylate, 2-hydroxyethyl acrylate, acrylic acid and the second t-butyl-2-ethyl hexanoate were premixed and put into a second funnel (Premix II).

The solvents, polymer aqueous dispersion and t-butyl 2-ethyl hexanoate were heated to 95° C. and refluxed. Thereafter, Premixes I and II were added concurrently and continuously taking 4 hours. While the α,β-ethylenically unsaturated monomers were added, water was separated by azeotropic distillation from the polymer aqueous dispersion and removed continuously through the Dean & Stark apparatus. Immediately after the addition of Premixes I and II, a mixture of t-butyl 2-ethyl hexanoate and ethylene glycol monoethylether acetate was added taking 1 hour. After refluxing until the theoretical amount of water had been completely removed, polymer non-aqueous dispersion B33 was obtained by cooling. This polymer non-aqueous dispersion B33 contained 11% polymer particles based on the total non-volatile matter with resins and had characteristics of an average particle diameter of 170 nm, 56.2% non-volatile matter, a viscosity of T and an acid value of 17.5.

Further, this dispersion B33 was analyzed by the same method as described in Manufacturing Example B1, (i) and (ii), and the following total ionic group concentration in polymer particle (I) and Na ion concentrations in dispersion were determined.

$$I = I_1 + I_2 = 4.58 \times 10^{-4} \text{ mol/g particle}$$

wherein
- $I_1$ is carboxylate ion concentration, i.e., $3.13 \times 10^{-4}$ mol/g particle, and
- $I_2$ is the sum of sulphonate and sulphate ion concentrations, i.e., $1.45 \times 10^{-4}$ mol/g particle.

Na ion concentration = 292 ppm

The carboxylate ion concentration $I_1$ of polymer particle determined here is equivalent to 98.1 mol % of total carboxylate ion concentration contained in the acrylic acid and Aerosol 18 formulated during the emulsion polymerization. Alternatively, the sum of sulphonate and sulphate ion concentrations $I_2$ is equivalent to 99.1 mol % of the sum of sulphonate and sulphate ion concentrations contained in fragments of Aerosol 18, Aerosol AY65 and ammonium persulphate formulated during the emulsion polymerization.

Alternatively, the Na ion concentration is equivalent to 99.6 mol % of total amount of Na ions in Aerosol 18, Aerosol AY65 and sodium bicarbonate formulated during the emulsion polymerization.

Manufacturing Example B34

Manufacture of Polymer Non-Aqueous Dispersion (Comparative Manufacturing Example)

To 20 parts of the polymer aqueous dispersion prepared in Manufacturing Example A31, 40 parts of acetone were added to aggregate polymer particles and a suspension was obtained. Sixty parts of this suspension were centrifugalized at 15,000 rpm for 1 hour to separate into supernatant and precipitate. To the precipitate, 40 parts of acetone were further added. After stirring thoroughly, the centrifugation was conducted again in the same manner as the above to separate into cleaning solution and precipitate. This procedure was repeated 5 times to wash the precipitate with acetone. The supernatants were all mixed together and anionic surfactants dissolved therein were quantitatively analyzed by Weatherburn process. As a result, anionic surfactants equivalent to 29 mol % of the total amount of Aerosol 18 and Aerosol AY65 used in Manufacturing Example A31 were detected in the supernatants. Namely, it proved that anionic surfactants equivalent to 71 mol % of the total amount of used surfactants remained in the polymer particles.

The precipitate was dried under a reduced pressure, then added to 38.4 parts of ethyl acetate and stirred with a stirrer to disperse therein to provide polymer non-aqueous dispersion B34 having 20% non-volatile matter.

Further, this dispersion B34 was analyzed by the same method as described in Manufacturing Example B1, (i) and (ii), and the following total ionic group concentrations (I) in polymer particle and Na ion concentrations in dispersion were determined.

$$I = I_1 + I_2 = 4.12 \times 10^{-4} \text{ mol/g particle}$$

wherein
- $I_1$ is carboxylate ion concentration, i.e., $3.08 \times 10^{-4}$ mol/g particle, and
- $I_2$ is the sum of sulphonate and sulphate ion concentrations, i.e., $1.16 \times 10^{-4}$ mol/g particle.

Na ion concentration = 150 ppm

The carboxylate ion concentration $I_1$ of polymer particle determined here is equivalent to 95.6 mol % of total carboxylate ion concentration contained in the acrylic acid and Aerosol 18 formulated during the emulsion polymerization.

Alternatively, the sum of sulphonate and sulphate ion concentrations $I_2$ is equivalent to 79.4 mol % of the sum of sulphonate and sulphate ion concentrations contained in fragments of Aerosol 18, Aerosol AY65 and ammonium persulphate formulated during the emulsion polymerization.

Alternatively, the Na ion concentration is equivalent to 51.1 mol % of total amount of Na ions in Aerosol 18, Aerosol AY65 and sodium bicarbonate formulated during the emulsion polymerization.

* Manufacturing Example B35

Manufacture of Polymer Non-Aqueous Dispersion (Comparative Manufacturing Example)

(a) Manufacture of α,β-ethylenically unsaturated monomers,

A four-necked flask equipped with stirrer, a thermometer, a Dean & Stark apparatus provided with a reflux condenser and a nitrogen gas feed pipe, was charged with 1,500 parts of 12-hydroxystearic acid and heated to raise the temperature up to 200° C. while stirring, as feeding nitrogen gas. When the acid value reached 39, the reaction was stopped. After the reactants was left to cool, 159 parts of xylene were added and a 12-hydroxystearic acid 5 mole condensate solution having 90% non-volatile matter was obtained. In this reaction 72 parts of water were separated. Then, using this 12-hydroxystearic acid 5 mole condensate solution, a mixture having the below-noted composition was stirred at a temperature of 120° C. in a four-necked flask equipped with a stirrer, a thermometer, a reflux condenser and a nitrogen gas feed pipe, to undergo an esterification reaction until acid value of non-volatile matter became below 1.0 and an α,β-ethylenically unsaturated monomer having 80% non-volatile matter was obtained.

| | |
|---|---|
| 12-Hydroxystearic acid 5 mole condensate solution | 1,586.67 parts |
| Glycidyl methacrylate | 142.00 parts |
| N,N-dimethyl benzylamine | 3.93 parts |
| Hydroquinone | 1.96 parts |
| Xylene | 227.94 parts |

(b) Manufacture of Amphipathic Dispersion Stabilizer.

A four-necked flask equipped with a stirrer, a reflux condenser, a thermometer and a dropping funnel was charged with 405.0 parts of ethyl acetate and 203.4 parts of n-butyl acetate and refluxed while stirring. Then, during refluxing, a mixture having the below-noted composition was added at a constant adding rate taking 3 hours and, by further refluxing for 2 hours, an amphipathic dispersion stabilizer having 33% non-volatile matter was obtained.

| | |
|---|---|
| $\alpha,\beta$-ethylenically unsaturated monomer solution prepared in the aforementioned item (a) | 275.0 parts |
| Methyl methacrylate | 104.5 parts |
| Acrylic acid | 5.5 parts |
| Azo-di-isobutyronitrile | 6.6 parts |

(c) Manufacture of Polymer Non-Aqueous Dispersion.

A four-necked flask equipped with a stirrer, a thermometer, a reflux condenser and a device for adding a liquid feed to returning condensates, was charged with a mixture having the below-noted composition.

| | |
|---|---|
| Mineral spirit | 1,588.0 parts |
| Hexane | 389.0 parts |
| Heptane | 2,080.2 parts |
| Methyl methacrylate | 236.4 parts |
| Azo-di-isobutyronitrile | 18.7 parts |
| Amphipathic dispersion stabilizer solution prepared in the aforementioned item (b) | 88.1 parts |

The above contents were heated to 100° C. and kept under refluxing for 1 hours. Then the under-noted components were premixed and added at a constant adding rate to hydrocarbons returning from the condenser, taking 6 hours.

| | |
|---|---|
| Methyl methacrylate | 4,491.8 parts |
| Methacrylic acid | 45.8 parts |
| Glycidyl methacrylate | 45.8 parts |
| Azo-di-isobutyronitrile | 60.2 parts |
| Amphipathic dispersion stabilizer solution prepared in the aforementioned item (b) | 945.3 parts |

However, for 1 hour at the last stage of the addition, 3.3 parts of triethylene diamine were additionally mixed in the above-mentioned mixture. After completion of the addition, the reaction mixture was kept under refluxing for 3 hours to provide polymer non-aqueous dispersion having 52% non-volatile matter and containing 31.2% polymer particles having an average particle diameter of 200 nm.

(d) Modification with Auxiliary Polymer of Particles.

A four-necked flask equipped with the devices used in the above step (c) was charged with the under-noted components and heated up to a refluxing temperature (115° C.).

| | |
|---|---|
| Polymer non-aqueous dispersion prepared in the above item (c) | 4,747.1 parts |
| Ethyl cyclohexane | 1,638.2 parts |

Then, the under-noted components were premixed and added at a constant adding rate to hydrocarbons returning from the condenser, taking 3 hours.

| | |
|---|---|
| Methyl methacrylate | 334.2 parts |
| 2-Hydroxyethyl methacrylate | 190.6 parts |
| Methacrylic acid | 49.6 parts |
| Butyl methacrylate | 369.1 parts |
| 2-Ethylhexyl acrylate | 381.2 parts |
| Styrene | 571.2 parts |
| t-Butyl peroxybenzoate | 90.6 parts |
| Octyl mercaptan | 84.7 parts |
| Amphipathic dispersion stabilizer solution prepared in the aforementioned item (b) | 149.5 parts |

After completion of the addition, the reaction mixture was refluxed for 2 hours. Then the following solvent mixture was added to obtain polymer non-aqueous dispersion B35 having 45% non-volatile matter and containing 25% polymer particles.

| | |
|---|---|
| n-Butyl alcohol | 559.0 parts |
| Xylene | 372.3 parts |
| Butyl acetate | 462.7 parts |

EXAMPLES 1~8

Application to 2 Coat-1 Bake Solids (A) Manufacture of Base Coat Paints (Examples 1~8).

Using the obtained polymer non-aqueous dispersions B1~B8, components excepting melamine resin in the formulations shown in Table 8 were fed into a paint shaker and dispersed until the particle size became 10 μm or less. Then, the melamine resin shown in Table 8 was added to prepare paints.

(B) Manufacture of clear coatings (Examples 1~4).

Mixtures having compositions shown in Table 9 were stirred to prepare clear coatings.

(C) Manufacture of tinted clear coatings. (Examples 5~7).

Components excepting melamine resin in the formulations shown in Table 10 were fed into a paint shaker and dispersed until the particle size became 10 μm or less. Then, the melamine resin shown in Table 10 was added to prepare coatings.

TABLE 8

| | Example | | | | | | | Unit: part |
|---|---|---|---|---|---|---|---|---|
| | 1(A) | 2(A) | 3(A) | 4(A) | 5(A) | 6(A) | 7(A) | 8(A) |
| Polymer non-aqueous dispersion | B1 14.3 | B2 14.3 | B3 28.6 | B4 28.6 | B5 57.2 | B6 57.2 | B7 28.6 | B8 42.9 |
| Acrylic resin (1) (2) | A | A | A | A | B | B | B | B |

TABLE 8-continued

| | Example | | | | | | | |
|---|---|---|---|---|---|---|---|---|
| | 1(A) | 2(A) | 3(A) | 4(A) | 5(A) | 6(A) | 7(A) | 8(A) |
| | 96.4 | 96.4 | 84.5 | 84.5 | 60.7 | 60.7 | 84.5 | 72.6 |
| Melamine resin (3) | 35 | 35 | 35 | 35 | 35 | 35 | 35 | 35 |
| Quinacridone (4) | 36 | 36 | 36 | 36 | 36 | 36 | 36 | 36 |
| Red iron oxide (5) | 4 | 4 | 4 | 4 | 4 | 4 | 4 | 4 |
| PTSA solution (6) | 1.5 | 1.5 | 1.5 | 1.5 | 1.5 | 1.5 | 1.5 | 1.5 |
| Xylene | 16 | 16 | 16 | 16 | 16 | 16 | 16 | 16 |
| n-Butyl alcohol | 4 | 4 | 4 | 4 | 4 | 4 | 4 | 4 |

(1) Acrylic resin A: same as the acrylic resin on the footnote of Table 5.
(2) Acrylic resin B: same as the acrylic resin on the footnote of Table 6.
(3) Resimene 755 (trade name of a methyl/butyl mix-etherified melamine resin having 100% heating residue, manufactured by Monsanto.
(4) Rubicron Red 500RG (trade name of quinacridone, manufactured by Toyo Soda Manufacturing Co., Ltd.).
(5) KN-R (trade name of red iron oxide, manufactured by Toda Kogyo Corporation).
(6) PTSA solution: p-toluene sulphonic acid 20% isopropylalcohol solution.

TABLE 9

| | Example | | | | Unit: part |
|---|---|---|---|---|---|
| | 1(B) | 2(B) | 3(B) | 4(B) | |
| Polymer non-aqueous dispersion | B1 | B2 | B3 | B4 | |
| | 14.3 | 14.3 | 28.6 | 28.6 | |
| Acrylic resin (1) | A | A | A | A | |
| | 96.4 | 96.4 | 84.5 | 84.5 | |
| Melamine resin (2) | 35 | 35 | 35 | 35 | |
| PTSA solution (3) | 1.5 | 1.5 | 1.5 | 1.5 | |
| Xylene | 8 | 8 | 8 | 8 | |
| n-Butyl alcohol | 2 | 2 | 2 | 2 | |

(1)~(3): same as the footnotes of Table 8.

TABLE 10

| | Example | | | | Unit: part |
|---|---|---|---|---|---|
| | 5(C) | 6(C) | 7(C) | 8(C) | |
| Polymer non-aqueous dispersion | B5 | B6 | B7 | B8 | |
| | 28.6 | 57.2 | 14.3 | 28.6 | |
| Acrylic resin (1) | B | B | B | B | |
| | 84.5 | 60.7 | 96.4 | 84.5 | |
| Melamine resin (2) | 35 | 35 | 35 | 35 | |
| Quinacridone (3) | 2 | 2 | 2 | 2 | |
| PTSA solution (4) | 1.5 | 1.5 | 1.5 | 1.5 | |
| Xylene | 8 | 8 | 8 | 8 | |
| n-Butyl alcohol | 2 | 2 | 2 | 2 | |

(1)~(4): same as the footnotes of Table 8.

(D) Preparation of coating films.

With respect to the coatings having compositions shown in Tables 8, 9 and 10, the base coat paints were diluted to viscosity for coating (14 seconds at 20° C. with Ford cup No. 4) with a thinner of toluene/n-butyl alcohol=8/2 (weight ratio), and the clear coatings and tinted clear coatings were diluted to viscosity for coating (30 seconds at 20° C. with Ford cup No. 4) with a thinner of xylene/n-butyl alcohol=9/1 (weight ratio). Then, onto a zinc phosphate treated mild steel sheet, a cationic electrocoating, Aqua No. 4200 (trade name, manufactured by Nippon Oil & Fats Co., Ltd.), was electrocoated so as to yield a dry film thickness of 20 μm and baked at 175° C. for 25 minutes. Further, a test sheet on which a sealer, Epico No. 1500 sealer (trade name, manufactured by Nippon Oil & Fats Co., Ltd.), was spray-coated so as to yield a dry film thickness of 40 μm followed by baking at 140° C. for 30 minutes, was air-spray-coated with the above diluted clear and tinted clear coatings and baked at 140° C. for 30 minutes in a vertical position. No saggings observed until the film thicknesses shown in Table 14, coating films having excellent appearance and quality as the coating film appearance values shown in Table 14 were obtained.

Further, after these coating films were soaked in hot water at 95° C. for 4 hours, none of blisters and discoloration were observed. After leaving the films to stand at 20° C. for 2 hours after the soaking, eleven parallel cross-cut lines at 2 mm spaces with a depth to reach the substrate were drawn with a knife to form square chequers on the coating films. A cellophane adhesive tape was adhered closely onto the chequers. When the adhesive tape was peeled off upwards at a stretch, no peeling of coating films was observed and the films exhibited excellent water resistance and adhesion.

Alternatively, an accelerated weathering test carried out for 1,500 hours with a sunshine weatherometer caused no cracks or blisters on any films, providing excellent weatherability.

EXAMPLES 9~15

Application to 2 Coat-1 Bake Metallic (A) Manufacture of base coat paints (Examples 9~15).

Using the polymer non-aqueous dispersions prepared in Manufacturing Examples B9~B15, coating compositions were manufactured with the formulations shown in Table 11 and diluted to viscosity for coating (14 seconds at 20° C. with Ford cup No. 4) with a thinner (toluene/n-butyl alcohol=8/2 by weight ratio).

(B) Manufacture of clear coatings (Examples 9~15)

Using the polymer non-aqueous dispersions prepared in Manufacturing Examples B9~B15, coating compositions were manufactured with the formulations shown in Table 12 and diluted to viscosity for coating (30 seconds at 20° C. with Ford cup No. 4) with a thinner (xylene/n-butyl alcohol=9/1 by weight ratio).

TABLE 11

| | Example | | | | | | | Unit: part |
|---|---|---|---|---|---|---|---|---|
| | 9(A) | 10(A) | 11(A) | 12(A) | 13(A) | 14(A) | 15(A) | |
| Polymer non-aqueous dispersion | B9 | B10 | B11 | B12 | B13 | B14 | B15 | |
| | 57.2 | 57.2 | 57.2 | 57.2 | 57.2 | 57.2 | 57.2 | |
| Acrylic resin 1) | A | A | A | A | A | A | A | |

TABLE 11-continued

Unit: part

| | Example | | | | | | |
|---|---|---|---|---|---|---|---|
| | 9(A) | 10(A) | 11(A) | 12(A) | 13(A) | 14(A) | 15(A) |
| | 60.7 | 60.7 | 60.7 | 66.6 | 66.6 | 50 | 50 |
| Melamine resin 2) | 35 | 35 | 35 | 31.4 | 31.4 | 41.4 | 41.4 |
| Aluminum pigment 3) | 15.4 | 15.4 | 15.4 | 15.4 | 15.4 | 15.4 | 15.4 |
| PTSA solution 4) | 1.5 | 1.5 | 1.5 | 1.5 | 1.5 | 1.5 | 1.5 |
| Xylene | 8 | 8 | 8 | 8 | 8 | 8 | 8 |
| n-Butyl alcohol | 2 | 2 | 2 | 2 | 2 | 2 | 2 |

1), 2), 4): same as the footnotes of Table 8.
3): Alpaste 7160N (trade name of aluminum pigment manufactured by Toyo Aluminium K.K.; non-volatile matter, 65%)

TABLE 12

Unit: part

| | Example | | | | | | |
|---|---|---|---|---|---|---|---|
| | 9(B) | 10(B) | 11(B) | 12(B) | 13(B) | 14(B) | 15(B) |
| Polymer non-aqueous dispersion | B9 14.3 | B10 14.3 | B11 14.3 | B12 28.6 | B13 28.6 | B14 42.9 | B15 42.9 |
| Acrylic resin 1) | A 96.4 | A 96.4 | A 96.4 | A 91.7 | A 91.7 | A 83.3 | A 83.3 |
| Melamine resin 2) | 35 | 35 | 35 | 30.7 | 30.7 | 28.6 | 28.6 |
| PTSA solution 3) | 1.5 | 1.5 | 1.5 | 1.5 | 1.5 | 1.5 | 1.5 |
| Xylene | 8 | 8 | 8 | 8 | 8 | 8 | 8 |
| n-Butyl alcohol | 2 | 2 | 2 | 2 | 2 | 2 | 2 |

1)~3): same as the footnotes of Table 8.

(C) Preparation of coating films.

Onto test sheets on which an electrocoated film and an intermediate coat were formed in the same manner as those in Examples 1~8, diluted base coat paints were air-spray-coated in two stages at an interval of 1 minute 30 seconds so as to yield a dry film thickness of 15 μm followed by setting at 20° C. for 3 minutes. Then, diluted clear coatings were air-spray-coated and test sheets were prepared in the same manner as those in Examples 1~8. All of the resulting coating films had no metallic marks thereon and were excellent in appearance and quality, sag limit film thickness, water resistance, adhesion and weatherability as shown in Table 14.

EXAMPLES 16~22

Application to 1 Coat Solids (A) Manufacture of coating compositions.

Using the polymer non-aqueous dispersions prepared in Manufacturing Examples B17~B20 and B22~B24, components excepting curing agent in the formulations shown in Table 13 were fed into a paint shaker and dispersed until the particle size became 10 μm or less. In Examples 16~18, two component coatings were manufactured and in Examples 19~22, further adding a curing agent and stirring, one component coating was manufactured.

TABLE 13

| | Example | | | | | | |
|---|---|---|---|---|---|---|---|
| | 16 (D) | 17 (D) | 18 (D) | 19 (D) | 20 (D) | 21 (D) | 22 (D) |
| Polymer non-aqueous dispersion | B 17 14.3 | B 18 14.3 | B 19 14.3 | B 20 14.3 | B 22 14.3 | B 23 14.3 | B 24 14.3 |
| Alkyd resin C 1) | 99.8 | 99.8 | 99.8 | 96.4 | 96.4 | 96.4 | 100 |
| Curing agent 2) | Coronate EH 33 | Coronate EH 33 | Coronate EH 33 | Resimene 755 35 | Resimene 755 35 | Cymel 303 35 | Cymel 1171 36.5 |
| Quinacridone 3) | | | | 15 | 15 | 15 | 15 |
| Red iron oxide 4) | | | | 15 | 15 | 15 | 15 |
| Phthalocyanine Blue 5) | 15 | | 15 | | | | |
| Titanium dioxide 6) | 15 | 15 | 15 | | | | |
| PTSA solution 7) | | | | 1.5 | 1.5 | 1.5 | 1.5 |
| Xylene | 16 | 16 | 16 | 16 | 16 | 16 | 16 |
| Butyl acetate | 2 | 2 | 2 | 2 | 2 | 2 | 2 |

(1) Alkyd resin C: same as the alkyd resin shown in the footnotes of Table 6.
(2) Curing agent: Coronate EH: trade name of hexamethylene diisocyanate trimer, manufactured by Nippon Polyurethane Industry Co. (21% isocyanate group, and 100% non-volatile matter). Resimene 755: as aforenoted. Cymel 303: trade name of methylated melamine resin manufactured by American Cyanamid; 100% non-volatile matter. Cymel 1171: as aforenoted.
(3) Rubicron Red 500 RG: as aforenoted.
(4) KN-R: as aforenoted.
(5) Fastgen Blue RGA: trade name of phthalocyanine blue manufactured by Dainippon Ink & Chemicals, Incorporated.
(6) JR-602: trade name of titanium dioxide, manufactured by Teikoku Kako Co., Ltd.

(B) Preparation of coating films.

Coating compositions having the formulations shown in Table 13 were diluted to viscosity for coating (30 seconds at 20° C. with Ford cup No. 4) with a thinner (xylene/ethylene glycol monoethylether acetate=9/1 by weight ratio). Meanwhile, with respect to Examples 16~18, Coronate EH was admixed immediately before the dilution.

Then, test sheets on which an electrocoated film and an intermediate coat were formed were air-spray-coated in the same manner as those in Examples 1~8, followed by drying in the same manner as those in Examples 1~8, to obtain coating films excellent in appearance and quality, sag limit film thickness, water resistance, adhesion and weatherability as shown in Table 15.

TABLE 14(a)

Unit: part

|  | Example | | | | |
|---|---|---|---|---|---|
|  | 1 | 2 | 3 | 4 | 5 |
| Coating system | 2 coat · 1 take solids | | | | |
| Coating color | Red | | | | |
| Form of clear | Clear | | | | Tinted clear |
| Coating composition | | | | | |
| Base coat | 1(A) | 2(A) | 3(A) | 4(A) | 5(A) |
| Clear coat | 1(B) | 2(B) | 3(B) | 4(B) | 5(C) |
| Binder 1) | | | | | |
| Base coat | | | | | |
| Polyol resin 2) | A | A | A | A | B |
|  | 63 | 63 | 61 | 61 | 56 |
| Curing agent | Resimene 755 | Resimene 755 | Resimene 755 | Resimene 755 | Resimene 755 |
|  | 37 | 37 | 39 | 39 | 44 |
| Polymer particles | B1 | B2 | B3 | B4 | B5 |
|  | 5.3 | 5.3 | 11.1 | 11.1 | 25.0 |
| Clear | | | | | |
| Polyol resin 2) | A | A | A | A | B |
|  | 63 | 63 | 61 | 61 | 61 |
| Curing agent | Resimene 755 | Resimene 755 | Resimene 755 | Resimene 755 | Resimene 755 |
|  | 37 | 37 | 39 | 39 | 39 |
| Polymer particles | B1 | B2 | B3 | B4 | B5 |
|  | 5.3 | 5.3 | 11.1 | 11.1 | 11.1 |
| appearance of coating film | | | | | |
| 20° gloss | 85 | 83 | 82 | 83 | 84 |
| D/I value 3) | 90 | 89 | 91 | 88 | 91 |
| Sag limit film thickness ($\mu$m) 4) | 44 | 44 | 47 | 47 | 47 |
| Film performance | | | | | |
| Water resistance (95° C. × after 4 hours) 5) | No abnormality | No abnormality | No abnormality | No abnormality | No abnormality |
| Adhesion (after water resistance test) 6) | 100/100 | 100/100 | 100/100 | 100/100 | 100/100 |
| Weatherability (1,500 hours with sunshine weatherometer) 7) | No abnormality | No abnormality | No abnormality | No abnormality | No abnormality |

|  | Example | | | | |
|---|---|---|---|---|---|
|  | 6 | 7 | 8 | 9 | 10 |
| Coating system | 2 coat · 1 bake solids | | | 2 coat · 1 bake metallic | |
| Coating color | Red | | | Silver | |
| Form of clear | Tinted clear | | | Clear | |
| Coating composition | | | | | |
| Base coat | 6(A) | 7(A) | 8(A) | 9(A) | 10(A) |
| Clear coat | 6(C) | 7(C) | 8(C) | 9(B) | 10(B) |
| Binder 1) | | | | | |
| Base coat | | | | | |
| Polyol resin 2) | B | B | B | A | A |
|  | 56 | 61 | 59 | 55 | 56 |
| Curing agent | Resimene 755 | Resimene 755 | Resimene 755 | Resimene 755 | Resimene 755 |
|  | 44 | 39 | 41 | 44 | 44 |
| Polymer particles | B6 | B7 | B8 | B9 | B10 |
|  | 25.0 | 11.1 | 17.6 | 25.0 | 25.0 |
| Clear | | | | | |
| Polyol resin 2) | B | B | B | A | A |
|  | 56 | 63 | 61 | 63 | 63 |
| Curing agent | Resimene 755 | Resimene 755 | Resimene 755 | Resimene 755 | Resimene 755 |
|  | 44 | 37 | 39 | 37 | 37 |
| Polymer particles | B6 | B7 | B8 | B9 | B10 |
|  | 25.0 | 5.3 | 11.1 | 5.3 | 5.3 |
| appearance of coating film | | | | | |
| 20° gloss | 85 | 86 | 85 | 85 | 84 |
| D/I value 3) | 91 | 90 | 89 | 90 | 88 |
| Sag limit film thickness ($\mu$m) 4) | 50 | 44 | 48 | 50 | 50 |
| Film performance | | | | | |
| Water resistance (95° C. × after 4 hours) 5) | No abnormality | No abnormality | No abnormality | No abnormality | No abnormality |
| Adhesion (after water resistance test) 6) | 100/100 | 100/100 | 100/100 | 100/100 | 100/100 |
| Weatherability (1,500 hours with sunshine weatherometer) 7) | oN abnormality | No abnormality | No abnormality | No abnormality | No abnormality |

|  | Example | | | | |
|---|---|---|---|---|---|
|  | 11 | 12 | 13 | 14 | 15 |
| Coating system | 2 coat · 1 bake metallic | | | | |

TABLE 14(a)-continued

Unit: part

| | | | | | |
|---|---|---|---|---|---|
| Coating color | | | Silver | | |
| Form of clear | | | Clear | | |
| Coating composition | | | | | |
| Base coat | 11(A) | 12(A) | 13(A) | 14(A) | 15(A) |
| Clear coat | 11(B) | 12(B) | 13(B) | 14(B) | 15(B) |
| Binder 1) | | | | | |
| Base coat | | | | | |
| Polyol resin 2) | A | A | A | A | A |
| | 56 | 50 | 50 | 38 | 38 |
| Curing agent | Resimene 755 | Resimene 755 | Resimene 755 | Resimene 755 | Resimene 755 |
| | 44 | 50 | 50 | 62 | 62 |
| Polymer particles | B11 | B12 | B13 | B14 | B15 |
| | 25.0 | 25.0 | 25.0 | 25.0 | 25.0 |
| Clear | | | | | |
| Polyol resin 2) | A | A | A | A | A |
| | 63 | 61 | 61 | 59 | 59 |
| Curing agent | Resimene 755 | Resimene 755 | Resimene 755 | Resimene 755 | Resimene 755 |
| | 37 | 39 | 39 | 41 | 41 |
| Polymer particles | B11 | B12 | B13 | B14 | B15 |
| | 5.3 | 11.1 | 11.1 | 17.6 | 17.6 |
| appearance of coating film | | | | | |
| 20° gloss | 85 | 86 | 83 | 82 | 83 |
| D/I value 3) | 91 | 89 | 88 | 90 | 89 |
| Sag limit film thickness (μm) 4) | 51 | 52 | 52 | 54 | 54 |
| Film performance | | | | | |
| Water resistance | No | No | No | No | No |
| (95° C. × after 4 hours) 5) | abnormality | abnormality | abnormality | abnormality | abnormality |
| Adhesion | 100/100 | 100/100 | 100/100 | 100/100 | 100/100 |
| (after water resistance test) 6) | | | | | |
| Weatherability (1,500 hours | No | No | No | No | No |
| with sunshine weatherometer) 7) | abnormality | abnormality | abnormality | abnormality | abnormality |

1) Calculated as solid matter.
2) Polyol resin:
A: acrylic resin A, and
B: acrylic resin B.
3) D/I value: a value representing sharpness of coating films (determined by Hunterlab Dorigon Model D47R-6F Glossmetr).
4) Sag limit film thickness: a maximal film thickness right before clear films start to sag.
5) No abnormality in water resistance: none of blisters and discoloration were observed on coating films.
6) Adhesion: 100/100 means no peeling was observed.
7) Weatherability: determined in accordance with JIS D 0205 7.6, Accelerated Weathering Testing Method (with sunshine carbon weatherometer).
No abnormality in weatherability: none of cracks and blisters were observed on coating films.

TABLE 15

| | Example | | | | | | |
|---|---|---|---|---|---|---|---|
| | 16 | 17 | 18 | 19 | 20 | 21 | 22 |
| Coating system | | | | 1 coat solids | | | |
| Coating color | | Blue | | | Red | | |
| Coating composition | 16(D) | 17(D) | 18(D) | 19(D) | 20(D) | 21(D) | 22(D) |
| Binder (1) | | | | | | | |
| Polyol resin 2) | C | C | C | C | C | C | C |
| | 65 | 65 | 65 | 63 | 63 | 63 | 63 |
| Curing agent | Coronate EH | Coronate EH | Coronate EH | Resimene 755 | Resimene 755 | Cymel 303 | Cymel 1171 |
| | 35 | 35 | 35 | 37 | 37 | 37 | 37 |
| Polymer particles | B17 | B18 | B19 | B20 | B22 | B23 | B24 |
| | 5.3 | 5.3 | 5.3 | 5.3 | 5.3 | 5.3 | 5.3 |
| Appearance of coating film | | | | | | | |
| 20° gloss | 84 | 83 | 82 | 83 | 85 | 84 | 84 |
| D/I value 3) | 90 | 91 | 92 | 91 | 90 | 89 | 91 |
| Sag limit film thickness (μm) 4) | 50 | 50 | 51 | 50 | 54 | 55 | 54 |
| Film performance | | | | | | | |
| Water resistance | No | No | No | No | No | No | No |
| (95° C. × after | abnor- | abnor- | abnor- | abnor- | abnor- | abnor- | abnor- |
| 4 hours) 5) | mality | mality | mality | mality | mality | mality | mality |
| Adhesion (after water resistance test) 6) | 100/100 | 100/100 | 100/100 | 100/100 | 100/100 | 100/100 | 100/100 |
| Weatherability | No | No | No | No | No | No | No |
| (1,500 hours with | abnor- | abnor- | abnor- | abnor- | abnor- | abnor- | abnor- |
| sunshine | mality | mality | mality | mality | mality | mality | mality |

TABLE 15-continued

| | Example | | | | | | | Unit: part |
|---|---|---|---|---|---|---|---|---|
| | 16 | 17 | 18 | 19 | 20 | 21 | 22 | |
| weatherometer) 7) | | | | | | | | |

1) Calculated as solid matter.
2) Polyol resin C: alkyd resin C.
3) D/I value: a value representing sharpness of coating films (determined by Hunterlab Dorigon Model D47R-6F Glossmeter).
4) Sag limit film thickness: a maximal film thickness right before clear films started to sag.
5) No abnormality in water resistance: non of blisters and discoloration were observed on coating films.
6) Adhesion: 100/100 means no peeling was observed.
7) Weatherability: determined in accordance with JIS D 0205 7.6, Accelerated Weathering Testing Method (with sunshine carbon weatherometer). No abnormality in weatherability: none of cracks and blisters were observed on coating film.

EXAMPLES 23~26

Application to 2 Coat.1 Bake Solids

Based on the formulations shown in Table 16, base coat and tinted clear coatings were manufactured in the same manner as that in Example 5 and 2 coat.1 bake solid coating films were prepared following the procedure in Example 5. The appearance and property, sag limit film thickness and performance of coating films are all together shown in Table 17.

All of these coating films had excellent qualities, inter alia, the polymer particles in Example 24 which had hydroxyl terminal groups on chain segments extending outwards from surfaces thereof, and the polymer particles in Example 25 which had a core-shell structure, exhibited particularly excellent sag limit film thicknesses and weatherability. Additionally, the polymer particles in Example 26 had a core-shell structure and hydroxyl terminal groups on chain segments extending outwards from surfaces thereof, so that they exhibited the highest quality among others in sag limit film thickness and weatherability.

TABLE 16

| | Example | | | | | | | | Unit: part |
|---|---|---|---|---|---|---|---|---|---|
| | 23(A) Base coat | 23(C) Tinted clear | 24(A) Base coat | 24(C) Tinted clear | 25(A) Base coat | 25(C) Tinted clear | 26(A) Base coat | 26(C) Tinted clear | |
| Polymer non-aqueous dispersion | B5 28.6 | B5 14.3 | B12 28.6 | B12 14.3 | B16 28.6 | B16 14.3 | B21 28.6 | B21 14.3 | |
| Acrylic resin 1) | B 84.5 | B 96.4 | B 91.7 | B 100 | B 84.5 | B 96.4 | B 84.5 | B 96.4 | |
| Melamine resin 2) | 35 | 35 | 30.7 | 32.9 | 35 | 35 | 35 | 35 | |
| Quinacridone 3) | 36 | 2 | 36 | 2 | 36 | 2 | 36 | 2 | |
| Red iron oxide 4) | 4 | | 4 | | 4 | | 4 | | |
| PTSA solution 5) | 1.5 | 1.5 | 1.5 | 1.5 | 1.5 | 1.5 | 1.5 | 1.5 | |
| Xylene | 16 | 8 | 16 | 8 | 16 | 8 | 16 | 8 | |
| n-Butyl alcohol | 4 | 2 | 4 | 2 | 4 | 2 | 4 | 2 | |

1)~5) same as the footnotes of Table 8

TABLE 17

| | Example | | | | Unit: part |
|---|---|---|---|---|---|
| | 23 | 24 | 25 | 26 | |
| Coating system | 2 coat . 1 bake solids | | | | |
| Coating color | Red | | | | |
| Form of clear | Tinted clear | | | | |
| Coating composition | | | | | |
| Base coat | 23(A) | 24(A) | 25(A) | 26(A) | |
| Clear coat | 23(C) | 24(C) | 25(C) | 26(C) | |
| Binder 1) | | | | | |
| Base coat | | | | | |
| Polyol resin | Acrylic resin B 61 | | | | |
| Curing agent | Resimene 755 39 | | | | |
| Polymer particles | B5 11.1 | B12 11.1 | B16 11.1 | B21 11.1 | |
| Tinted clear | | | | | |
| Polyol resin | Acrylic resin B 63 | | | | |
| Curing agent | Resimene 755 37 | | | | |
| Polymer particles | B5 5.3 | B12 5.3 | B16 5.3 | B21 5.3 | |
| Appearance of coating film | | | | | |
| 20° gloss | 84 | 85 | 85 | 86 | |
| D/I value 2) | 91 | 90 | 91 | 92 | |
| Sag limit film thickness (μm) 3) | 44 | 50 | 50 | 54 | |
| Film performance | | | | | |

TABLE 17-continued

| | Example | | | | Unit: part |
|---|---|---|---|---|---|
| | 23 | 24 | 25 | 26 | |
| Water resistance 4) (95° C. × after 4 hours) | No abnormality | No abnormality | No abnormality | No abnormality | |
| Adhesion 5) (after water resistance test) | 100/100 | 100/100 | 100/100 | 100/100 | |
| Weatherability 6) (sunshine weatherometr) | 2,600 hours | 3,400 hours | 3,500 hours | 5,200 hours | |

1) Calculated as solid matter.
2) D/I value: a value representing sharpness of coating films (determined by Hunterlab Dorigon Model D47R-6F Glossmeter).
3) Sag limit flim thickness: a maximal film thickness right before clear films started to sag.
4) No abnormality in water resistance: none of blisters and discoloration were observed on coating films.
5) Adhesion: 100/100 means no peeling was observed.
6) Time required for crack development.

EXAMPLES 27~30

Application to 2 Coat.1 Bake Solids

Based on the formulations shown in Table 18, base coat paints and clear or tinted clear coatings were manufactured, as to Examples 27 and 28, in the same manner as that in Example 1, and as to Examples 29 and 30, in the same manner as that in Example 5, and 2 coat.1 bake solid coating films were prepared following the procedure in Example 1. As shown in Table 21, coating films having excellent appearance and quality, sag limit film thickness and performance of film were obtained.

TABLE 18

| | Example | | | | | | | | Unit: part |
|---|---|---|---|---|---|---|---|---|---|
| | 27 (A) Base coat | 27 (B) Clear | 28 (A) Base coat | 28 (B) Clear | 29 (A) Base coat | 29 (C) Tinted clear | 30 (A) Base coat | 30 (C) Tinted clear | |
| Polymer non-aqueous dispersion | B25 28.6 | B25 14.3 | B26 28.6 | B26 14.3 | B27 28.6 | B27 14.3 | B28 28.6 | B28 14.3 | |
| Acrylic resin[1] | A 84.5 | A 96.4 | A 84.5 | A 96.4 | B 84.5 | B 96.4 | B 84.5 | B 96.4 | |
| Melamine resin[2] | 35 | 35 | 35 | 35 | 35 | 35 | 35 | 35 | |
| Quinacridone[3] | 36 | — | 36 | — | 36 | 2 | 36 | 2 | |
| Red iron oxide[4] | 4 | — | 4 | — | 4 | — | 4 | — | |
| PTSA solution[5] | 1.5 | 1.5 | 1.5 | 1.5 | 1.5 | 1.5 | 1.5 | 1.5 | |
| Xylene | 16 | 8 | 16 | 8 | 16 | 8 | 16 | 8 | |
| n-Butyl alcohol | 4 | 2 | 4 | 2 | 4 | 2 | 4 | 2 | |

[1]~[5]same as the footnotes of Table 8

EXAMPLES 31 and 32

Based on the formulations shown in Table 19, base coat paints and clear coatings were manufactured in the same manner as that in Example 9, and 2 coat.1 bake metallic coating films were prepared following the procedure in Example 9. As shown in Table 21, coating films having excellent appearance and quality, sag limit film thickness and performance of film were obtained.

TABLE 19

| | Example | | | | Unit: part |
|---|---|---|---|---|---|
| | 31 (A) Base coat | 31 (B) Clear | 32 (A) Base coat | 32 (B) Clear | |
| Polymer non-aqueous dispersion | B29 57.2 | B29 28.6 | B30 57.2 | B30 28.6 | |
| Acrylic resin[1] | A 60.7 | A 84.5 | A 60.7 | A 84.5 | |
| Melamine resin[2] | 35 | 35 | 35 | 35 | |
| Aluminum pigment[3] | 15.4 | — | 15.4 | — | |
| PTSA solution[4] | 1.5 | 1.5 | 1.5 | 1.5 | |
| Xylene | 8 | 8 | 8 | 8 | |
| n-Butyl alcohol | 2 | 2 | 2 | 2 | |

[1, 2, 4]same as the footnotes of Table 8
[3]same as the footnotes of Table 11

EXAMPLES 33 and 34

Application to 1 Coat Solids

Based on the formulations shown in Table 20, 1 coat solids coating compositions and coating films were manufactured in the same manner as that in Example 16. As shown in Table 21, coating films having excellent appearance and quality, sag limit film thickness and performance of film were obtained.

TABLE 20

| | Example | | Unit: part |
|---|---|---|---|
| | 33 (D) | 34 (D) | |
| Polymer non-aqueous particles | B31 14.3 | B32 14.3 | |
| Alkyd resin C[1] | 99.8 | 99.8 | |
| Coronate EH[2] | 33 | 33 | |
| Phthalocyanine Blue[3] | 15 | 15 | |
| Titanium dioxide[4] | 15 | 15 | |
| Xylene | 16 | 16 | |
| Butyl acetate | 2 | 2 | |

[1]~[4]same as the footnotes of Table 10

TABLE 21

Unit: part

| | | Example | | | |
|---|---|---|---|---|---|
| | | 27 | 28 | 29 | 30 |
| Coating system | | 2 coat · 1 bake solids | | | |
| Coating color | | Red | | | |
| Form of clear | | Clear | | Tinted clear | |
| Coating composition | Base coat | 27 (A) | 28 (A) | 29 (A) | 30 (A) |
| | Clear coat | 27 (B) | 28 (B) | 29 (C) | 30 (C) |
| Binder[1] | Base coat | | | | |
| | Polyol resin[2] | A | A | B | B |
| | | 61 | 61 | 61 | 61 |
| | Curing agent | Resimene 755 | Resimene 755 | Resimene 755 | Resimene 755 |
| | | 39 | 39 | 39 | 39 |
| | Polymer particles | B25 | B26 | B27 | B28 |
| | | 11.1 | 11.1 | 11.1 | 11.1 |
| | Clear coat | | | | |
| | Polyol resin[2] | A | A | B | B |
| | | 63 | 63 | 63 | 63 |
| | Curing agent | Resimene 755 | Resimene 755 | Resimene 755 | Resimene 755 |
| | | 37 | 37 | 37 | 37 |
| | Polymer particles | B25 | B26 | B27 | B28 |
| | | 5.3 | 5.3 | 5.3 | 5.3 |
| Appearance of coating film | 20° gloss | 82 | 83 | 84 | 85 |
| | D/I value[3] | 90 | 91 | 91 | 92 |
| Sag limit film thickness (μm)[4] | | 45 | 44 | 49 | 48 |
| Film performance | Water resistance[5] (95° C. × after 4 hours) | No abnormality | No abnormality | No abnormality | No abnormality |
| | Adhesion[6] (after water resistance test) | 100/100 | 100/100 | 100/100 | 100/100 |
| | Weatherability[7] (1,500 hours with sunshine weatherometer) | No abnormality | No abnormality | No abnormality | No abnormality |

| | | Example | | | |
|---|---|---|---|---|---|
| | | 31 | 32 | 33 | 34 |
| Coating system | | 2 coat · 1 bake metallic | | 1 coat solids | |
| Coating color | | Silver | | Blue | |
| Form of clear | | Clear | | — | |
| Coating composition | Base coat | 31 (A) | 32 (A) | | |
| | Clear coat | 31 (B) | 32 (B) | 33 (D) | 34 (D) |
| Binder[1] | Base coat | | | | |
| | Polyol resin[2] | A | A | C | C |
| | | 56 | 56 | 65 | 65 |
| | Curing agent | Resimene 755 | Resimene 755 | Coronate KH | Coronate KH |
| | | 44 | 44 | 35 | 35 |
| | Polymer particles | B29 | B30 | B31 | B32 |
| | | 25 | 25 | 5.3 | 5.3 |
| | Clear coat | | | | |
| | Polyol resin[2] | A | A | | |
| | | 61 | 61 | | |
| | Curing agent | Resimene 755 | Resimene 755 | | |
| | | 39 | 39 | | |
| | Polymer particles | B29 | B30 | | |
| | | 11.1 | 11.1 | | |
| Appearance of coating film | 20° gloss | 83 | 84 | 82 | 83 |
| | D/I value[3] | 89 | 90 | 91 | 90 |
| Sag limit film thickness (μm)[4] | | 48 | 49 | 52 | 51 |
| Film performance | Water resistance[5] (95° C. × after 4 hours) | No abnormality | No abnormality | No abnormality | No abnormality |
| | Adhesion[6] (after water resistance test) | 100/100 | 100/100 | 100/100 | 100/100 |
| | Weatherability[7] (1,500 hours with sunshine weatherometer) | No abnormality | No abnormality | No abnormality | No abnormality |

[1] Calculated as solid matter.
[2] Polyol resin:
A: acrylic resin A,
B: acrylic resin B, and
C: alkyd resin C.
[3] D/I value: a value representing sharpness of coating films (determined by Hunterlab Dorigon Model D47R-6F Glossmeter).
[4] Sag limit thickness: a maximal film thickness right before clear films in Examples 27~32 and 1 coat films in Examples 33 and 34 started to sag.
[5] No abnormality in water resistance: none of blisters and discoloration were observed on coating films.
[6] Adhesion: 100/100 means no peeling was observed.
[7] Weatherability: determined in accordance with JIS D 0205 7.6, Accelerated Weathering Testing Method (with sunshine carbon weatherometer).
No abnormality in weatherability: none of cracks and blisters were observed on coating films.

COMPARATIVE EXAMPLES 1~4

Based on the formulations shown in Table 22, base coat and tinted clear coatings were manufactured in the same manner as that in Example 7 and 2 coat. 1 bake solids coating films were prepared following the procedure in Example 7. The appearance and property, sag limit film thickness and performance of coating films are all together shown in Table 23.

TABLE 22

Unit: part

| | Comparative Example | | | | | | | |
|---|---|---|---|---|---|---|---|---|
| | 1 (A) Base coat | 1 (C) Tinted clear | 2 (A) Base coat | 2 (C) Tinted clear | 3 (A) Base coat | 3 (C) Tinted clear | 4 (A) Base coat | 4 (C) Tinted clear |
| Polymer non-aqueous dispersion | B33 115.6 | B33 80.9 | B34 50 | B34 20 | B35 40 | B35 20 | B7 28.6 | B7 0.6 |
| Acrylic resin[1] | — | (B) 32.5 | (B) 91.7 | (B) 100 | (B) 78.3 | (B) 93.3 | (B) 84.5 | (B) 108.3 |
| Melamine resin[2] | 35 | 35 | 35 | 35 | 35 | 35 | 35 | 35 |
| Quinacridone[3] | 36 | 2 | 36 | 2 | 36 | 2 | 36 | 2 |
| Red iron oxide[4] | 4 | | 4 | | 4 | | 4 | |
| PTSA solution[5] | 1.5 | 1.5 | 1.5 | 1.5 | 1.5 | 1.5 | 1.5 | 1.5 |
| Xylene | 16 | 8 | 16 | 8 | 16 | 8 | 16 | 8 |
| n-Butyl alcohol | 4 | 2 | 4 | 2 | 4 | 2 | 4 | 2 |

[1]~[5] same as the footnotes of Table 8

TABLE 23

Unit: part

| | Comparative Example | | | |
|---|---|---|---|---|
| | 1 | 2 | 3 | 4 |
| Coating system | 2 coat · 1 bake solids | | | |
| Coating color | Red | | | |
| Form of clear | Tinted clear | | | |
| Coating composition | | | | |
| Base coat | 1(A) | 2(A) | 3(A) | 4(A) |
| Clear coat | 1(C) | 2(C) | 3(C) | 4(C) |
| Binder 1) | | | | |
| Base coat | | | | |
| Acrylic resin 2) | Manufacturing Example B33 62 | (B) 61 | Manufacturing Example B35 + (B) 61 | (B) 61 |
| Resimene 755 | 38 | 39 | 39 | 39 |
| Polymer particles | B33 7.8 | B34 11.1 | B35 11.1 | B7 11.1 |
| Turbid coat | | | | |
| Acrylic resin 2) | Manufacturing Example B33 + (B) 63 | (B) 63 | Manufacturing Example B35 + (B) 63 | (B) 63 |
| Resimene 755 | 37 | 37 | 37 | 37 |
| Polymer particles | B33 5.3 | B34 5.3 | B35 5.3 | B7 0.2 |
| Appearance of coating film | | | | |
| 20° gloss | 45 | 47 | 18 | 81 |
| D/I value 3) | 63 | 65 | 47 | 83 |
| Sag limit film thickness (μm) 4) | 43 | 40 | 42 | 32 |
| Film performance | | | | |
| Water resistance 95° C. × after 4 hours) | Remarkable blisters, gloss decrease and discoloration | Remarkable blisters, gloss decrease and discoloration | | No abonrmality 5) |
| Adhesion (after water resistance test) | Base/clear detachment | Base/clear detachment | | 100/100 6) |
| Weatherability (sunshine weatherometer) | Blisters and cracks appeared, gloss decreased, after 1000 hours | Blisters and cracks appeared, gloss decreased, after 1100 hours | | No abnormality for 1500 hours |

1) Calculated as solid matter.
2) Acrylic resin:
B: acrylic resin B.
Manufacturing Example B33: acrylic resin synthesized in the manufacture of polymer non-aqueous dispersions.
Manufacturing Example B35: auxiliary polymer synthesized for the modification of particles.
3) D/I value: same as aforenoted.
4) Sag limit film thickness: a maximal film thickness right before clear films started to sag.
5) None of blisters and discoloration were observed on coating films.
6) 100/100 means no peeling was observed.
7) Weatherability: determined in accordance with JIS D 0205 7.6, Accelerated Weathering Testing Method (with sunshine carbon weatherometer).
No abnormality in weatherability: none of cracks and blisters were observed on coating films.

In Comparative Examples 1 and 2 which were based on the process described in U.S. Pat. No. 4,290,932 (gazette of Japanese Patent Application Laid-open No. 56-76,447), surfaces of polymer particles were charged with negative electricity due to fragments of anionic surfactants and polymerization initiators remained thereon so that the polymer particles were adsorbed to quinacridone and red iron oxide charged with positive electricity, resulting in pigment aggregation whereby the appearance and quality of coating films were markedly deteriorated. Additionally, by virtue of the residual anionic surfactants on the polymer particles, appreciable blisters were formed in the water resistance test and also remarkable deterioration of gloss by water permeation into the coating films and discoloration were observed. Further, in the adherence test after the water resistance test, the tinted clear coats were peeled off from the base coats. Additionally, the accelerated weathering test with a sunshine weatherometer also resulted in formation of appreciable blisters and cracks and deterioration of gloss.

In Comparative Example 3 which was based on the gazette of Japanese Patent Application Laid-open No. 53-133,234, the polymer particles had a too small polarity and exhibited poor compatibility with the binder (acrylic resin B), resulting in pigment aggregation whereby the appearance and quality of coating films were markedly deteriorated.

Alternatively, in Comparative Example 4, since the polymer particles were formulated in an amount of less than 1% based on the weight of the binder resin mixture, the sag limit film thickness was no more than 32 μm.

What is claimed is:

1. A coating composition comprising
100 parts by weight of resinous solid binder component composed of
30~90% by weight of a polyol resin and
10~70% by weight of a curing agent to react with hydroxyl groups and
1~50 parts by weight as polymer particles of a polymer non-aqueous dispersion comprising polymer particles having a total ionic group concentration (I), a hexane tolerance (HT) and a degree of swelling in acetone (S) which are in ranges satisfying the following relations, respectively:

$I < 2 \times 10^{-5}$ mol/g particle, $5 < HT < 40$ and $S < 10$;

wherein the polymer non-aqueous dispersion is manufactured by a process comprising the steps of:
(1) emulsion polymerizing the following components:
(a) an $\alpha,\beta$-ethylenically unsaturated monomer containing a hydroxyl group;
(b) a polyfunctional $\alpha,\beta$-ethylenically unsaturated monomer, and
(c) an $\alpha,\beta$-ethylenically unsaturated monomer other than the above (a) and (b), by using a water soluble polymerization initiator in a soap-free system or in the presence of a surface active agent containing an ester group; adding an organic solvent to a resultant polymer aqueous dispersion; and then adding a basic compound catalyst or an acidic compound catalyst thereto to hydrolyze completely said surface active agent and water-soluble polymerization initiator at a temperature not exceeding 95° C. as in the condition of suspension;

(2) adding an acidic compound or basic compound to said suspension to neutralize said basic compound catalyst or acidic compound catalyst; then after adding a dispersion stabilizing resin, further adding an amine salt of organic acid, followed by leaving a system of said suspension to stand to separate into two layers, an organic layer and a water layer; after removing the water layer, washing the organic layer by adding water; adding an amine salt of an organic acid, followed by standing to separate, and removing the water layer; and (3) removing residual water in the organic layer.

2. A coating composition as claimed in claim 1, wherein said polyol resin is at least one resin selected from the group consisting of acrylic resins, alkyd resins and polyester resins.

3. A coating composition as claimed in claim 1, wherein said curing agent is at least one material selected from the group consisting of amino resins and isocyanate compounds.

* * * * *